United States Patent
Iwashima et al.

(10) Patent No.: US 10,766,630 B2
(45) Date of Patent: Sep. 8, 2020

(54) DIRECT CURRENT STABILIZATION POWER SUPPLY SYSTEM

(71) Applicant: KAWASAKI JUKOGYO KABUSHIKI KAISHA, Kobe-shi, Hyogo (JP)

(72) Inventors: Atsushi Iwashima, Yamagata (JP); Kazushige Sugimoto, Amagasaki (JP); Jun Yamaguchi, Kobe (JP); Suguru Takayama, Kakamigahara (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 444 days.

(21) Appl. No.: 15/736,963

(22) PCT Filed: Jun. 15, 2016

(86) PCT No.: PCT/JP2016/002897
§ 371 (c)(1),
(2) Date: Dec. 15, 2017

(87) PCT Pub. No.: WO2016/203766
PCT Pub. Date: Dec. 22, 2016

(65) Prior Publication Data
US 2018/0362181 A1 Dec. 20, 2018

(30) Foreign Application Priority Data
Jun. 15, 2015 (JP) .................................. 2015-120282

(51) Int. Cl.
*B64D 41/00* (2006.01)
*H02M 3/00* (2006.01)
(Continued)

(52) U.S. Cl.
CPC ................ *B64D 41/00* (2013.01); *H02J 1/10* (2013.01); *H02J 1/14* (2013.01); *H02J 3/32* (2013.01);
(Continued)

(58) Field of Classification Search
CPC .............. B64D 41/00; B64D 2041/002; B64D 2221/00; H02J 1/10; H02J 1/14;
(Continued)

(56) References Cited

U.S. PATENT DOCUMENTS

2009/0295314 A1 12/2009 Ganev et al.
2009/0302153 A1 12/2009 Matasso et al.
2011/0288711 A1 11/2011 Yanagisawa

FOREIGN PATENT DOCUMENTS

JP 2010-178508 A 8/2010
WO 2014/022316 A1 2/2014

OTHER PUBLICATIONS

Oct. 9, 2018 Extended European Search Report issued in European Patent Application No. 16811241.5.

*Primary Examiner* — Robert L Deberadinis
(74) *Attorney, Agent, or Firm* — Oliff PLC

(57) ABSTRACT

A first DC power supply section of a DC stabilization power supply system includes at least a generator and a PWM converter. A second DC power supply section of the DC stabilization power supply system includes at least a battery and a boost converter. Each of these DC power supply sections performs a power supply stabilization operation for supplying DC power to an electric system and absorbing regenerative power generated from an actuator or the like. A PWM converter controls adjustment of the amount of the power supply stabilization operation to be performed by the DC power supply section and the amount of the power stabilization operation to be performed by the DC power
(Continued)

supply section, by changing a target voltage value of a DC bus.

22 Claims, 14 Drawing Sheets

(51) Int. Cl.
| | |
|---|---|
| *H02M 7/12* | (2006.01) |
| *H02P 9/04* | (2006.01) |
| *H02J 1/14* | (2006.01) |
| *H02J 3/32* | (2006.01) |
| *H02J 7/34* | (2006.01) |
| *H02J 1/10* | (2006.01) |
| *H02J 1/00* | (2006.01) |
| *B60R 16/03* | (2006.01) |

(52) U.S. Cl.
CPC ................ *H02J 7/34* (2013.01); *H02M 3/00* (2013.01); *H02M 7/12* (2013.01); *H02P 9/04* (2013.01); *B60R 16/03* (2013.01); *B64D 2041/002* (2013.01); *B64D 2221/00* (2013.01); *H02J 1/00* (2013.01); *Y02T 50/54* (2013.01)

(58) Field of Classification Search
CPC ...... H02J 3/32; H02J 7/34; H02J 1/00; H02M 3/00; H02M 7/12; H02P 9/04; B60R 16/03; Y02T 50/54
See application file for complete search history.

DIRECT CURRENT STABILIZATION POWER SUPPLY SYSTEM

TECHNICAL FIELD

The present invention relates to a direct current (PC) stabilization power supply system which is capable of stabilization a voltage.

BACKGROUND ART

Typically, as power systems for an aircraft, three kinds of systems, which are a hydraulic system, a bleed air system, and an electric system, are mounted in the aircraft. The hydraulic system is used for the operations of landing gears, control surfaces, etc. The bleed air system is used for the operations of air conditioning devices, pressure application devices, de-icing devices, and others, which are equipped inside the aircraft. The electric system is used for the operations of electric devices and electronic devices. In recent years, there has been a trend that at least a portion of the hydraulic system and a portion of the bleed air system are replaced by the electric system with a higher efficiency. For example, as actuators (including an actuator for controlling the control surface) included in the aircraft, electric (electrically powered) actuators have been widely used, instead of conventional hydraulic (hydraulically powered) actuators. The aircraft in which the hydraulic system, the bleed air system, and other systems are replaced as much as possible by the electric system, is typically named more electric aircraft (MEA).

It is known that with a progress of the MEA, an amount of a change (fluctuation) in a voltage or frequency in the electric system increases, and the electric system becomes unstable. For example, in the case of the electric actuator, regenerative power with a great magnitude is generated (electric power with a great magnitude is returned) from a driving motor, and thereby a voltage in the electric system significantly rises temporarily (for a certain time). In addition, the regenerative power is sent to a generator mounted in an engine, and thereby an engine gear box might be adversely affected due to backlash. Or, if power loads (devices mounted in the aircraft and supplied with electric power from the electric system) supplied with the electric power from the electric system, increase temporarily, a significant voltage decrease (drop) may occur.

It is known that in the electric system in which the MEA has progressed, various configurations are used to deal with the above-described voltage increase or voltage decrease (drop). For example, Patent Literature 1 discloses that a bidirectional electric accumulator is provided in an electric system to absorb the regenerative power (excess electric power) from an actuator. In another example, Patent Literature 2 discloses that regenerative power from an actuator is released to a power sink and absorbed. As examples of the power sink, a plurality of auxiliary loads or generators are described in Patent Literature 2.

CITATION LIST

Patent Literature

Patent Literature 1: US Patent Publication No. 2009/0302153 Specification
Patent Literature 2: US Patent Publication No. 2009/0295314 Specification

SUMMARY OF INVENTION

Technical Problem

However, in the configuration disclosed in Patent Literature 1, it is necessary to set the capacity of the electrical accumulator based on assumed regenerative power to be absorbed (return of the electric power) or a temporary electric power increase. Likewise, in the configuration disclosed in Patent Literature 2, it is necessary to set a maximum load of the generator based on the magnitude of the regenerative power to be absorbed or a temporary electric power increase. For this reason, the size of a power supply device such as the electrical accumulator or the generator increases. In addition, the size of a converter (boost converter, PWM converter, etc.) connected to the power supply device also increases.

In particular, in a low-temperature environment, charging characteristics of the electrical accumulator are degraded. Therefore, it is necessary to consider the use of the electrical accumulator in the low-temperature environment in addition to the amount of electric power in setting of the capacity of the electrical accumulator. Or, in a state in which an engine of an aircraft is idle, the generator cannot sufficiently absorb a change in the electric power. In this case, the size of the power supply device may further increase.

As described above, to well absorb the change in the electric power in the conventional configuration, it is necessary to increase the size of the power supply device such as the electrical accumulator or the generator, according to the magnitude of the change in the electric power. In addition, it is necessary to increase the size of the converter for controlling the power supply device according to the magnitude of the change in the electric power.

The present invention has been developed to solve the above-described problem, and an object of the present invention is to provide a direct current (DC) stabilization power supply system, which can well absorb a change in electric power and properly maintain a power supply quality, in a DC power supply bus which supplies DC power generated by conversion of the electric power generated in an alternating current (AC) generator.

Solution to Problem

To solve the above-described problem, a direct current stabilization power supply system of the present invention, comprises an electric system including a direct current bus and an electric device connected to the direct current bus; an alternating current power supply and a direct current power supply which supply electric power to the electric system; a charging/discharging control section which is connected to the direct current power supply and the direct current bus and controls charging and discharging amounts of the direct current power supply; a power conversion section which is connected to the charging/discharging control section, the alternating current power supply, and the direct current bus, and bidirectionally converts alternating current power and direct current power; and a first direct current power supply section including at least the alternating current power supply and the power conversion section, and a second direct current power supply section including at least the direct current power supply and the charging/discharging control section, the first direct current power supply section and the second direct current power supply section being operative as a direct current power supply section which performs a power supply stabilization operation for supplying the direct current power to the electric system and absorbing regenerative power generated from the electric device, wherein the power conversion section is configured to control adjustment of an amount of the power supply stabilization operation to be performed by the first direct current power supply section and an amount of the power supply stabilization operation to be performed by the second direct current power supply section, by changing a target value of a voltage of the direct current bus.

In accordance with the above-described configuration, the electric system of the direct current (DC) includes two direct current power supply systems which are the first direct current power supply section and the second direct current power supply section, the first direct current power supply section includes the alternating current (AC) power supply generator) and the power conversion section (e.g., pulse width modulation (PMM) converter), and the second direct current power supply section includes the direct current power supply (e.g., battery) and the charging/discharging control section (e.g., boost converter). Each of the direct current power supply sections performs the power supply stabilization operation. Further, the power conversion section included in the first direct current power supply section adjusts the amount of the power supply stabilization operation to be performed by the first direct current power supply section and the amount of the power supply stabilization operation to be performed by the second direct current power supply section, based on a change in the voltage of the direct current bus.

In accordance with this configuration, the electric system includes two paths which are a path in which the first direct current power supply section including the alternating current power supply deals with a change in the electric power and a path in which the second direct current power supply section including the direct current power supply deals with the change in the electric power, and supply of the electric power or absorption of a change in the electric power (the power supply stabilization operation) can be well shared (divided) by the first direct current power supply section and the second direct current power supply section accordingly. This makes it possible to well absorb the change in the electric power without a need to increase the size of the power supply device or the converter connected to the power supply device.

As a result, the size of the power supply device or the converter is not increased. Therefore, an increase in the weight of the aircraft can be avoided, and the electric device such as the electric actuator, which may possibly generate the regenerative power, can be easily used. Further, the path for dealing with the change in the electric power can be changed depending on the situation. In this way, electric energy can be efficiently used.

In the direct current stabilization power supply system having the above-described configuration, the power conversion section may be configured to control adjustment of the amount of the power supply stabilization operation to be performed by the first direct current power supply section and the amount of the power supply stabilization operation to be performed by the second direct current power supply section, by controlling the voltage of the direct current bus by a proportional-integral control, and the charging/discharging control section may be configured to control the charging and discharging amounts by a proportional control.

In the direct current stabilization power supply system having the above-described configuration, a voltage change range within which the power conversion section performs a control and a voltage change range within which the charging/discharging control section performs a control may be preset to different ranges, the power conversion section may be configured to control adjustment of the amount of the power supply stabilization operation to be performed by the first direct current power supply section and the amount of the power supply stabilization operation to be performed by the second direct current power supply section, by a proportional-integral control, and the charging/discharging control section may be configured to control the charging and discharging amounts, by the proportional-integral control.

In the direct current stabilization power supply system having the above-described configuration, the power conversion section may include: a power conversion circuit connected to the alternating current power supply; an alternating current voltage detection section which detects an alternating current voltage of the alternating current power supply; an alternating current detection section which detects an alternating current of the alternating current power supply; a direct current voltage detection section which detects a direct current voltage of the electric system; and a power conversion control section which drives the power conversion circuit based on the alternating current voltage which is detected, the alternating current which is detected, and the direct current voltage which is detected, the power conversion control section may be configured to calculate active power of the alternating current power supply, based on the alternating current voltage which is detected and the alternating current which is detected, the power conversion control section may be configured to calculate a direct current voltage command value based on the active power and operation information of the alternating current power supply, the power conversion control section may be configured to calculate an alternating current command value based on the direct current voltage command value and the direct current voltage which is detected, by a proportional-integral control, and the power conversion control section may be configured to control the power conversion circuit by use of the alternating current command value.

In the direct current stabilization power supply system having the above-described configuration, the power conversion control section may be configured to calculate a phase of the alternating current power supply based on the alternating current voltage which is detected, and the power conversion control section may be configured to control the power conversion circuit based on the alternating current command value, the alternating current which is detected, and the phase.

In the direct current stabilization power supply system having the above-described configuration, the charging/discharging control section may include: a voltage regulation circuit connected to the direct current power supply; a direct current power supply monitoring section which monitors a state of charge of the direct current power supply and a cell temperature of the direct current power supply; a direct current voltage detection section which detects a direct current voltage of the electric system; a direct current detection section which detects a direct current of the electric system; and a direct current voltage control section which drives the voltage regulation circuit, based on the state of charge of the direct current power supply, the direct current voltage which is detected, and the direct current which is detected, the direct current voltage control section may be configured to calculate a compensation voltage of the state of charge, based on the state of charge of the direct current power supply, the direct current voltage control section may be configured to calculate a direct current command value based on the compensation voltage of the state of charge, and the direct current voltage which is detected, by the proportional control, and the direct current voltage control section may be configured to control the voltage regulation circuit, by use of the direct current command value and the direct current which is detected.

For example, in a case where the direct current power supply is the battery, an example of the direct current power supply monitoring section may be a battery state monitoring section which monitors the state of charge (SOC) of the battery and a cell temperature of the battery.

In the direct current stabilization power supply system having the above-described configuration, the direct current voltage control section may be configured to calculate the direct current command value based on the compensation voltage of the state of charge and the direct current voltage which is detected, by performing a derivative control concurrently with a proportional control.

In the direct current stabilization power supply system having the above-described configuration, a reference value of a direct current voltage of the electric system may be preset, the power conversion section may be configured to increase or decrease the reference value, and the charging/discharging control section may be configured to control the charging and discharging amounts of the direct current power supply to decrease or increase the direct current voltage, according to an increase or decrease in the reference value.

In the direct current stabilization power supply system having the above-described configuration, a limit value of a change in the electric power of the alternating current power supply may be preset, the power conversion section may be configured to change a direct current voltage at a high rate, in a case where the change in the electric power which exceeds the limit value occurs, and the charging/discharging control section may be configured to control the charging and discharging amounts of the direct current power supply to supply the electric power corresponding to a change amount of the direct current voltage which is changed by the power conversion section.

In the direct current stabilization power supply system having the above-described configuration, the power conversion section may be configured to monitor active power of the alternating current power supply, a reference value of a direct current voltage of the electric system and a threshold of the active power may be preset, the power conversion section may be configured to increase the direct current voltage at a high rate for a first period which passes until the active power reaches 0 from a time point when the active power being monitored has fallen below the threshold, and then increase the direct current voltage at a rate lower than the rate in the first period until the active power reaches the reference value for a second period which passes after the active power has reached 0, and the charging/discharging control section may be configured to control the charging and discharging amounts so that the direct current power supply is charged with the direct current power corresponding to a change amount of the direct current voltage.

In the direct current stabilization power supply system having the above-described configuration, the alternating current power supply may be a generator which is mounted in an engine and operates with a rotation of the engine.

In the direct current stabilization power supply system having the above-described configuration, the direct current power supply may be at least one of an electric accumulator and an electric double-layer capacitor.

In the direct current stabilization power supply system having the above-described configuration, the electric device may include an electric actuator.

In the direct current stabilization power supply system having the above-described configuration may be used in an electric system of an aircraft.

In the direct current stabilization power supply system having the above-described configuration, the aircraft may include an auxiliary power unit (APU), and the second direct current power supply section may function as a power supply for starting the APU.

In the direct current stabilization power supply system having the above-described configuration, the alternating current power supply may include an engine generator which is mounted in an engine included in the aircraft and operates according to a rotation of the engine, and an auxiliary power unit (APU) generator included in the APU, and in a case where the engine generator or the APU generator does not supply the electric power to the direct current bus, the second direct current power supply section may supply the electric power to the direct current bus.

In the direct current stabilization power supply system having the above-described configuration, the first direct current power supply section may include the engine generator as the alternating current power supply, and the first direct current power supply section may be configured to operate as a motor controller and a motor for starting the engine, by the electric power supplied from the APU generator, when the engine is started.

The direct current stabilization power supply system having the above-described configuration may further comprise: an auxiliary power unit (APU) power conversion section which is connected to the APU generator and the direct current bus, and bidirectionally converts the alternating current power and the direct current power, at least the APU generator and the API) power conversion section may constitute a third direct current power supply section, and the APU power conversion section may be configured to control adjustment of the amount of the power supply stabilization operation to be performed by the third direct current power supply section and the amount of the power supply stabilization operation to be performed by the second direct current power supply section, based on a change in the voltage of the direct current bus.

Advantageous Effects of Invention

In accordance with the above-described configuration, the present invention can obtain an advantage in that it is possible to provide a direct current (DC) stabilization power supply system, which can well absorb a change in electric power and properly maintain a power supply quality, in a DC power supply bus which supplies DC power generated by conversion of the electric power generated in an alternating current (AC) generator.

DESCRIPTION OF EMBODIMENTS

Hereinafter, preferred embodiments of the present invention will be described with reference to the drawings. Throughout the drawings, the same or corresponding constituents are designated by the same reference symbols and will not be described repeatedly.

Embodiment 1

[Example of Configuration of DC Stabilization Power Supply System]

Figure 1:
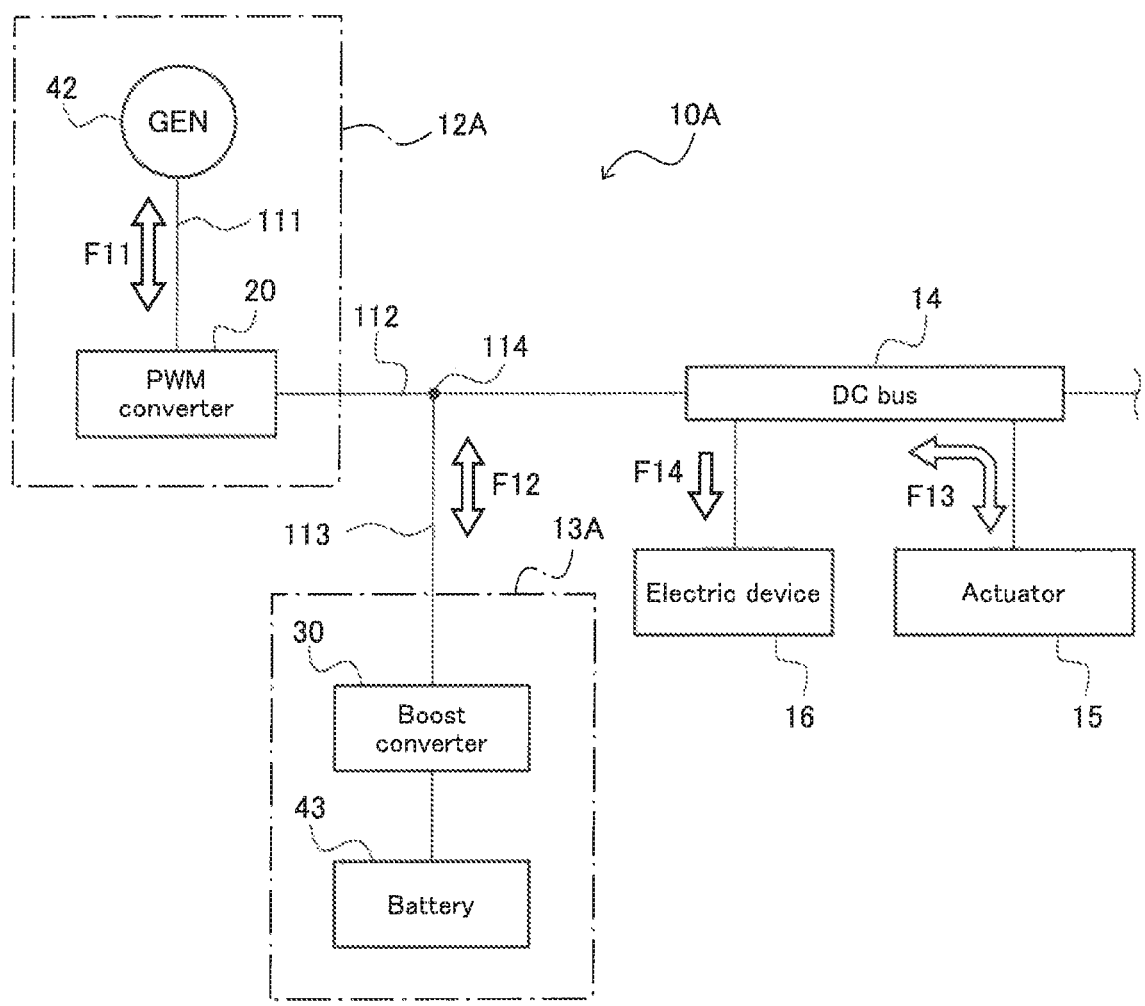
FIG. 1 is a block diagram showing an example of the configuration of a direct current (DC) stabilization power supply system according to Embodiment 1 of the present invention.

Hereinafter, an example of the configuration of a direct current (DC) stabilization power supply system of the present invention will be specifically described with reference to FIG. 1. A DC stabilization power supply system 10A of FIG. 1 is applied to an electric system (electric system which is driven mainly by DC power) of a more electric aircraft (MEA) (not shown). The DC stabilization power supply system 10A includes a first DC power supply section 12A, a second DC power supply section 13A, a DC bus (DC power supply bus) 14, an actuator 15, an electric device 16, and the like. The first DC power supply section 12A includes a generator 42 and a pulse width modulation (PWM) converter 20. The second DC power supply section 13A includes a battery 43 and a boost converter 30. The generator 42 and the battery 43 are power supply devices of the aircraft.

As examples of the generator 42 included in the first DC power supply section 12A, there are an alternating current (AC) generator mounted in an engine of the aircraft (not shown), a starter generator included in an auxiliary power unit (APL), and the like. In the configuration of FIG. 1, the generator 42 is an engine generator which is mounted in the engine of the aircraft, and driven by the rotation of the engine. As will be described later, the PWM converter 20 as the power conversion section is connected to the generator 42. Since the PWM converter 20 bidirectionally converts the AC power and the DC power (see bidirectional block arrow F11 of FIG. 1), the PWM converter 20 is configured to absorb regenerative power generated from the actuator 15 (or the electric device 16).

The battery 43 included in the second DC power supply section 13A may be a known electric accumulator (secondary battery), and is not limited to this. For example, the battery 43 may be replaced by a known electric double-layer capacitor or the like. Thus, it is sufficient that the second DC power supply section 13A includes a known electric accumulator. As the electric accumulator, the second DC power supply section. 13A may include only the single battery 43, a plurality of batteries 43, or a combination of different kinds of electric accumulators (e.g., a combination of the electric accumulator and the electric double-layer capacitor, etc.)

As will be described later, in the present embodiment, the boost converter 30 as the charging/discharging control section is connected to the battery 43. The boost converter 30 is configured to charge the battery 43 with the DC power from the DC bus 14 or the first DC power supply section 12A, and discharge the battery 43 (see bidirectional block arrow F12 of FIG. 1). Therefore, as will be described later, the battery 43 is configured to absorb the regenerative power from the actuator 15 (or the electric device 16) and supplies transit required electric power to the actuator 15 and to the electric device 16.

The generator 42 is connected to the PWM converter 20 via an AC wire 111, and thus constitutes the first DC power supply section 12A. The battery 43 is connected to the boost converter 30 and thus constitutes the second DC power supply section 13A. A generator DC wire 112 as well as the AC wire 111 is connected to the PWM converter 20. A battery DC Wire 113 is connected to the boost converter 30. The generator DC wire 112 and the battery DC wire 113 are connected to each other in such a manner that they are merged at a DC link 114. The DC link 114 is connected to the DC bus 14. In this configuration, the DC bus 14 is connected to the battery 43 as the DC power supply via the boost converter 30 and to the generator 42 as the AC power supply via the PWM converter 20 as the power conversion section.

The specific configurations of the AC wire 111, the generator DC wire 112, the battery DC wire 113, and the DC link 114 are not particularly limited. As the AC wire 111, the generator DC wire 112, the battery DC wire 113, and the DC link 114, harness, a branch connector, and the like which are known in the field of the electric system of the aircraft may be suitably used. It is sufficient that the battery 43 and the boost converter 30 are connected to each other via a known DC wire. In the present embodiment, it is sufficient that the voltage of the DC bus 14 may be DC 270V, DC±135V or DC±270V.

The actuator 15 and the electric device 16 are connected to the DC bus 14. The actuator 15 may be, for example, an actuator for controlling the control surface of the aircraft (control surface actuator) and may be other actuators. A plurality of actuators 15 are mounted in the aircraft. A part of or all of the plurality of actuators 15 may be electrically powered. Although the actuator 15 of FIG. 1 is an electric actuator operative by electric energy, the aircraft may include actuators operative by power systems (hydraulic system or bleed air system) which are other than the electric actuator, depending on the configuration of the aircraft.

The electric device 16 of FIG. 1 includes devices other than the actuator 15, which are operative by the electric energy. Examples of the electric device 16 are heaters, compressors, motors, etc. In a case where the actuator 15 is the electric actuator, the actuator 15 itself is included in the "electric device." Therefore, in a limited (narrow) sense, the electric device 16 does not include the actuator 15, whereas in a broad sense, the "electric device" includes the actuator 15 as well as the electric device 16 in a limited sense.

The electric power is supplied from the DC bus 14 to the actuator 15. The regenerative power generated from the actuator 15 is sent through the DC bus 14 and absorbed by either one of the two DC power supply sections 12A, 13A as will be described later (see bidirectional block arrow F13 of FIG. 1). The electric power is also supplied from the DC bus 14 to the electric device 16 (see block arrow F14 of FIG. 1). The regenerative power is also generated from the electric device 16, depending on the kind of the electric device 16. In this case, as hi the case of the actuator 15, the regenerative power generated from the electric device 16 is sent through the DC bus 14 and absorbed by either one of the two DC power supply sections 12A, 13A.

In the present embodiment, the DC bus 14 and the electric device in a broad sense (the actuator 15 and the electric device 16 in a limited sense) constitute the electric system of the aircraft. The generator 42 and the battery 43 (the power supply devices) of FIG. 1 correspond to the AC power supply and the DC power supply, respectively, which supply the electric power to the electric system. In the present embodiment, the electric system, the first DC power supply section 12A, and the second DC power supply section 13A constitute the DC stabilization power supply system 10A. The configuration of the electric system is not limited to that shown in FIG. 1 and may include other constituents which are not shown in FIG. 1. The configuration of the DC stabilization power supply system 10A is not limited to that shown in FIG. 1 and may include other constituents which are not shown in FIG. 1.

In the present embodiment, the kind of the aircraft into which the DC stabilization power supply system 10A is to be incorporated is not particularly limited, and may be a known aircraft (airplane). In the present specification, the aircraft is not limited to a general fixed wing aircraft and may be a rotary-wing aircraft. The aircraft may be an aerostat such as an airship instead of an aerodyne such as the fixed-wing aircraft and the rotary-wing aircraft, so long as the present invention is applied to it. In a case where the fixed-wing aircraft is classified into a large aircraft and a small aircraft, the electric system which is driven mainly by the DC power tends to be typically used in the small aircraft. However, the aircraft to which the present invention is applied is not limited to the small aircraft and may include the large aircraft, of course.

As described above, the PWM converter 20 constitutes the first DC power supply section 12A together with the generator 42 as the AC power supply. The PWM converter 20 functions as the power conversion section which is connected to the boost converter 30, the generator 42, and the DC bus 14, and bidirectionally converts the AC power and the DC power (see bidirectional block arrow F11 of FIG. 1). As described above, the boost converter 30 constitutes the second DC, power supply section 13A together with the battery 43 as the DC power supply. The boost converter 30 is connected to the battery 43 and the DC bus 14 and functions as a charging/discharging control section which controls charging and discharging amounts of the battery 43 (see bidirectional block arrow F12 of FIG. 1).

In the present embodiment, as shown in FIG. 1, the first DC power supply section 12A includes the PWM converter 20 and the generator 42, while the second DC power supply section 13A includes the boost converter 30 and the battery 43. However, the configuration of the first DC power supply section 12A and the configuration of the second DC power supply section 13A are not limited to these. Specifically, the first DC power supply section 12A may include constituents other than the PWM converter 20 and the generator 42, and the second DC power supply section 13A may include constituents other than the boost converter 30 and the battery 43.

In the present embodiment, the PWM converter 20 is used as an example of the power conversion section of the first DC power supply section 12A and the boost converter 30 is used as the charging/discharging control section of the second DC power supply section 13A. However, the configuration of the power conversion section and the configuration of the charging/discharging control section are not limited to these, and other known configurations may be used.

In the DC stabilization power supply system 10A, each of the first and second DC power supply sections 12A, 13A performs a power supply stabilization operation. The power supply stabilization operation includes a power supply operation for supplying the DC power to the electric system and a power absorption operation for absorbing the regenerative power generated from the actuator 15, the electric device 16, or the like. Each of the First and second DC power supply sections 12A, 13A is able to perform the power supply stabilization operation. In addition, the power supply stabilization operation can be shared (divided) by the DC power supply sections 12A, 13A, depending on the state of the electric system.

As described above, the PWM converter 20 converts the AC power from the generator 42 into the DC power, and the DC power from the DC bus 14 into the AC power. Further, as will be described later, the PWM converter 20 is configured to control adjustment of the amount of the power supply stabilization operation to be performed by the first DC power supply section 12A and the amount of the power supply stabilization operation to be performed by the second. DC power supply section 13A, based on a change in the voltage of the DC bus 14.

[Example of Configuration of PWM Converter]

Figure 2:
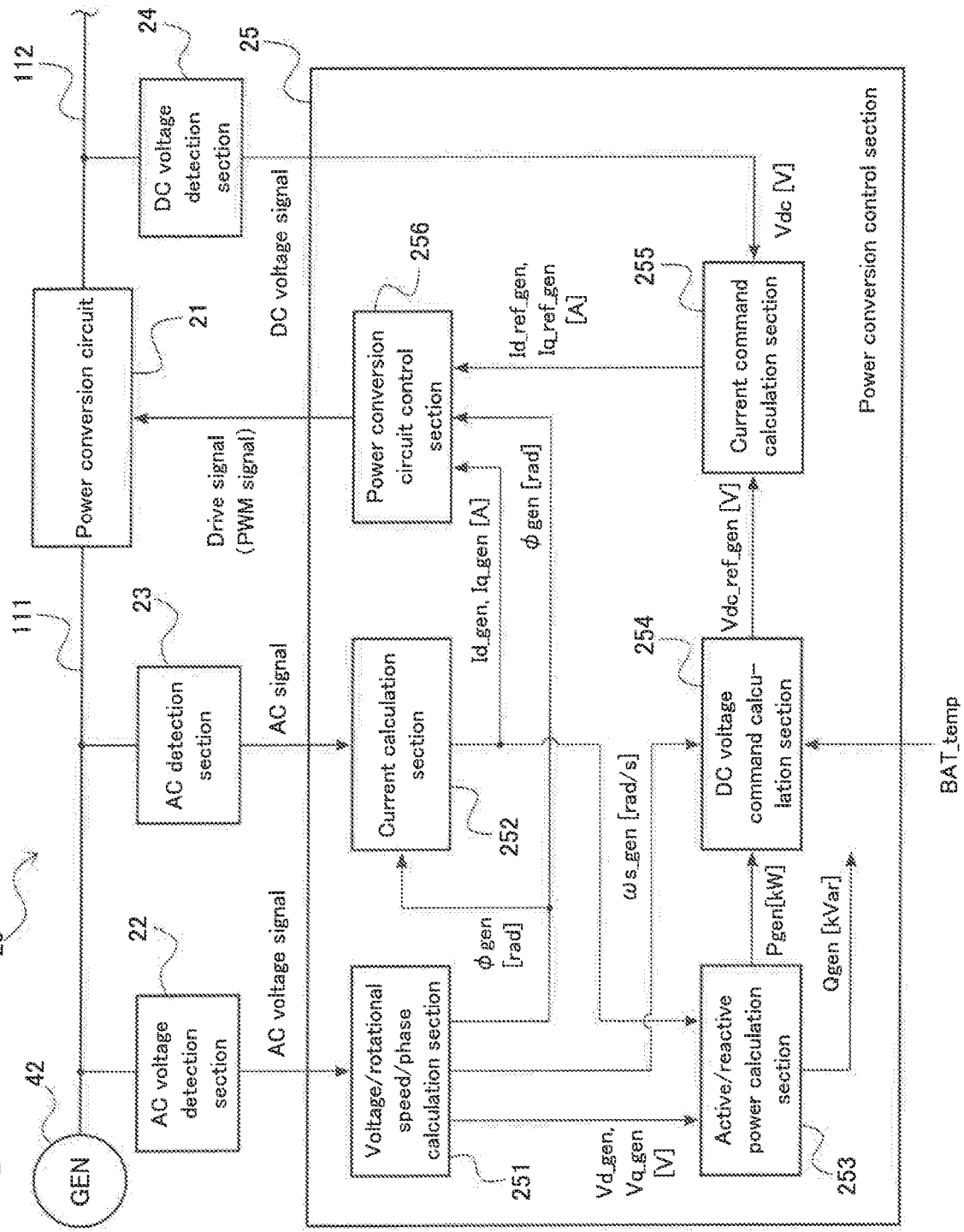
FIG. 2 is a block diagram showing an example of the configuration of a pulse width modulation (PWM) converter (power conversion section) of a first DC power supply section included in the DC stabilization power supply system of FIG. 1.

Next, an example of the specific configuration of the PWM converter 20 which constitutes the first DC power supply section 12A together with the generator 42 will be described, with reference to FIGS. 2 and 3A and 3B.

As described above, the PWM converter 20 functions as the power conversion section which is connected to the generator 42 as the AC power supply and bidirectionally converts the AC power and the DC power. As shown in FIG. 2, the PWM converter 20 according to the present embodiment includes a power conversion circuit 21, an AC voltage detection section an AC detection section 23, a DC voltage detection section 24, a power conversion control section 25, and the like.

The power conversion circuit 21 is connected to the generator 42 via the AC wire 111, and to the DC link 114 (not shown in FIG. 2) via the generator DC wire 112 (see FIG. 1). Under control of the power conversion control section 25, the power conversion circuit 21 converts the AC power supplied from the generator 42 into the DC power, and converts the DC regenerative power from the DC bus 14 into the AC power. The specific configuration of the power conversion circuit 21 is not particularly limited. For example, a PWM converter circuit using a known insulated gate bipolar transistor (IGBT), or the like can be suitably used as the power conversion circuit 21.

The AC voltage detection section 22 and the AC detection section 23 are provided on a wire on the generator 42 side from the perspective of the power conversion circuit 21, namely, the AC wire 111, and detects an AC voltage of the generator 42 and an alternating current (AC) of the generator 42, respectively. The DC voltage detection section 24 is provided on a wire on the DC bus 14 side (DC link 114 side) from the perspective of the power conversion circuit 21, namely the generator DC wire 112, and detects a voltage of the DC power (DC voltage) obtained by the conversion in the power conversion circuit 21. As shown in FIG. 2, a detection value (AC voltage signal) of the AC voltage, a detection value (AC signal) of the AC, and a detection value (DC voltage signal) of the DC voltage are input to the power conversion control section 25. The specific configurations of the AC voltage detection section 22, the AC detection section 23, and the DC voltage detection section 24 are not particularly limited, and a known AC voltage meter, a known AC meter, and a known DC voltage meter can be suitably used as the AC voltage detection section 22, the AC detection section 23, and the DC voltage detection section 24, respectively.

The power conversion control section 25 drives the power conversion circuit 21 based on the AC voltage signal, the AC signal, and the DC voltage signal. The specific configuration of the power conversion control section 25 is not particularly limited. In the present embodiment, for example, as shown in FIG. 2, the power conversion control section 25 includes a voltage/rotational speed/phase calculation section 251, a current calculation section 252, an active/reactive power calculation section 253, a DC voltage command calculation section 254, a current command calculation section 255, and a power conversion circuit control section 256.

The voltage/rotational speed/phase calculation section 251 calculates the voltages Vd_gen, Vq_gen (unit: V) of the AC power, the rotational speed ωs_gen (unit: rad/s) of the generator 42, and the phase φ gen (unit: rad) of the AC voltage, based on the AC voltage signal from the AC voltage detection section 22. The current calculation section 252 calculates the currents Id_gen, Iq_gen (unit: A) of the AC power, based on the AC signal from the AC detection section 23, and the phase φ gen of the AC voltage from the voltage/rotational speed/phase calculation section 251. The active/reactive power calculation section 253 calculates the active power Pgen (unit: kW) of the AC power and the reactive power Qgen (unit: kVar) of the AC, power, based on the voltages Vd_gen, Vq_gen of the AC power from the voltage/rotational speed/phase calculation section 251, and the currents Id_gen, Iq_gen of the AC power from the current calculation section 252. Therefore, in the present embodiment, the PWM converter 20 is configured to monitor the active power and the reactive power of the generator 42.

The DC voltage command calculation section 254 calculates a DC voltage command value Vdc_ref_gen (unit: V), based on the active power Pgen from the active/reactive power calculation section 253, the rotational speed ωs_gen of the generator 42 from the voltage/rotational speed/phase calculation section 251, and a battery cell temperature BAT_temp (output from the boost converter 30, see FIG. 4) of the battery 43 which will be described later. The current command calculation section 255 calculates current command values Id_ref_gen, Iq_ref_gen (unit: A), based on the DC voltage command value Vdc_ref_gen from the DC voltage command calculation section 254, and the DC voltage signal Vdc (unit: V) from the DC voltage detection section 24.

The power conversion circuit control section 256 generates a drive signal (PWM signal) for the power conversion circuit 21, based on the phase φ gen (unit: rad) of the AC voltage from the voltage/rotational speed/phase calculation section 251, the currents Id_gen, Iq_gen of the AC power from the current calculation section 252, and the current command values Id_ref_gen, Iq_ref_gen from the current command calculation section 255, and inputs the drive signal to the power conversion circuit 21. The power conversion circuit 21 converts the AC power into the DC power, or the DC power into the AC power based on the drive signal from the power conversion circuit control section 256.

The specific configurations of the voltage/rotational speed/phase calculation section 251, the current calculation section 252, the active/reactive power calculation section 253, the DC voltage command calculation section 254, the current command calculation section 255, and the power conversion circuit control section 256 are not particularly limited. The voltage/rotational speed/phase calculation section 251, the current calculation section 252, the active/reactive power calculation section 253, the DC voltage command calculation section 254, the current command calculation section 255, and the power conversion circuit control section 256 may be configured as known logic circuits including switching elements, adders, subtracters, comparators, and the like, or may, be functional configurations implemented in such a manner that a processor (e.g., CPU) (not shown) operates according to programs stored in a memory (not shown).

Figure 3A:
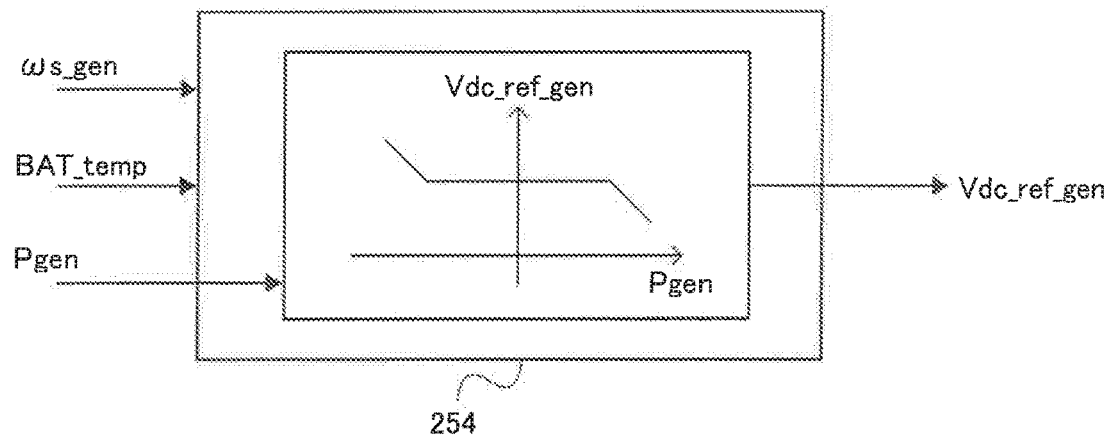
FIG. 3A is a schematic block diagram showing an example of the configuration of a DC voltage command calculation section included in the PWM converter of FIG. 2.
Figure 3B:
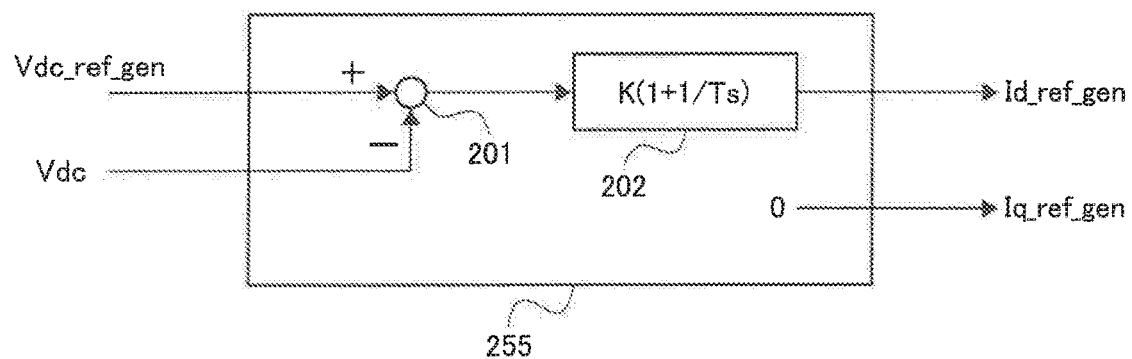
FIG. 3B is a schematic block diagram showing an example of the configuration of a current command calculation section included in the PWM converter of FIG. 2.

FIG. 3A shows an example of the specific configuration of the DC voltage command calculation section 254, and FIG. 3B shows an example of the specific configuration of the current command calculation section 255. In the DC voltage command calculation section 254 of FIG. 3A, the magnitude of the DC voltage command value Vdc_ref_gen is preset according to the magnitude of the active power Pgen of the AC power. The rotational speed ωs_gen of the generator 42 can be said as operation information of the generator 42, and the battery cell temperature BAT_temp of the battery 43 can be said as the operation information of the battery 43. The DC voltage command calculation section 254 adjusts the DC voltage command value Vdc_ref_gen corresponding to the magnitude of the active power Pgen, based on these operation information, and thus generates the final DC voltage command value Vdc_ref_gen.

In the present embodiment, the rotational speed ωs_gen is used as the operation information of the generator. In the present embodiment, an example of the generator 42 is an AC generator which is mounted in the engine of the aircraft and is operative with the rotation of the engine. For this reason, the amount of electric power generated by the generator 42 is varied between a case where the engine of the aircraft is rotating at a low speed and a case where the engine is rotating at a high speed. The rotational speed ωs_gen of the generator 42 is the information on which the engine speed is reflected, and can be effectively used as the operation information of the generator 42.

The specific operation information of the AC power supply is not limited to only the rotational speed, and information other than the rotational speed may be used as the operation information of the AC power supply, depending on conditions including the kind of the AC power supply. Although the battery cell temperature is used as the operation information of the battery 43 which is the DC power supply, the specific operation information of the DC power supply is not limited to this. For example, in a case where the DC power supply is the electric double-layer capacitor, the temperature of the electric double-layer capacitor may be used as the operation information of the DC power supply. Therefore, the temperatures of the DC power supplies of many kinds can be suitably used as the operation information of the DC power supply. Also, as in the case of the operation information of the AC power supply, the information other than the temperature of the DC power supply may be used as the operation information of the DC power supply, depending on the conditions.

The current command calculation section 255 of FIG. 3B includes a subtracter 201 and a proportional-integral (PI) controller 202. The subtracter 201 subtracts the DC voltage signal Vdc from the DC voltage command value Vdc_ref_gen calculated by the DC voltage command calculation section 254, and outputs a subtraction value (deviation) to the PI controller 202. The PI controller 202 generates the current command value Id_ref_gen, of a direct axis (d-axis), of the current command values Id_ref_gen, Iq_ref_gen, by use of a preset proportional gain K and an integral time Ts, based on the subtraction value input to the PI controller 202. As the current command value Iq_ref_gen of a quadrature axis (g-axis), 0 is output irrespective of the subtraction value.

As described above, the current command calculation section 255 calculates the current command values Id_ref_gen, Iq_ref_gen, by the PI control, based on the DC voltage command value Vdc_ref_gen and the DC voltage signal Vdc, and the power conversion circuit control section 256 generates the drive signal (PWM signal) based on the current command values Id_ref_gen, Iq_ref_gen. The power conversion circuit 21 is driven by this drive signal, and performs conversion between the AC power and the DC power. The DC voltage of the electric system including the DC bus 14 is maintained to reach the DC voltage command value Vdc_ref_gen. Since the voltage of the DC bus 14 may be DC 270V, DC±135V or DC±270V, the reference value of the DC voltage is DC270V, DC±135V, or DC±270V.

As described above, the DC voltage command value Vdc_ref_gen used for the calculation of the current command values Id_ref_gen, Iq_ref_gen, under the PI control, is adjusted according to the operation information (e.g., the rotational speed ωs_gen) of the generator 42. For this reason, the current command values Id_ref_gen, Iq_ref_gen change and the drive signal changes, depending on the operation state of the generator 42. Therefore, the power conversion circuit 21 can maintain the reference value of the DC voltage by the PI control. In addition, the calculation method of the Vdc_ref_gen can be changed based on the operation information of the generator 42.

[Example of Configuration of Boost Converter]

Figure 4:
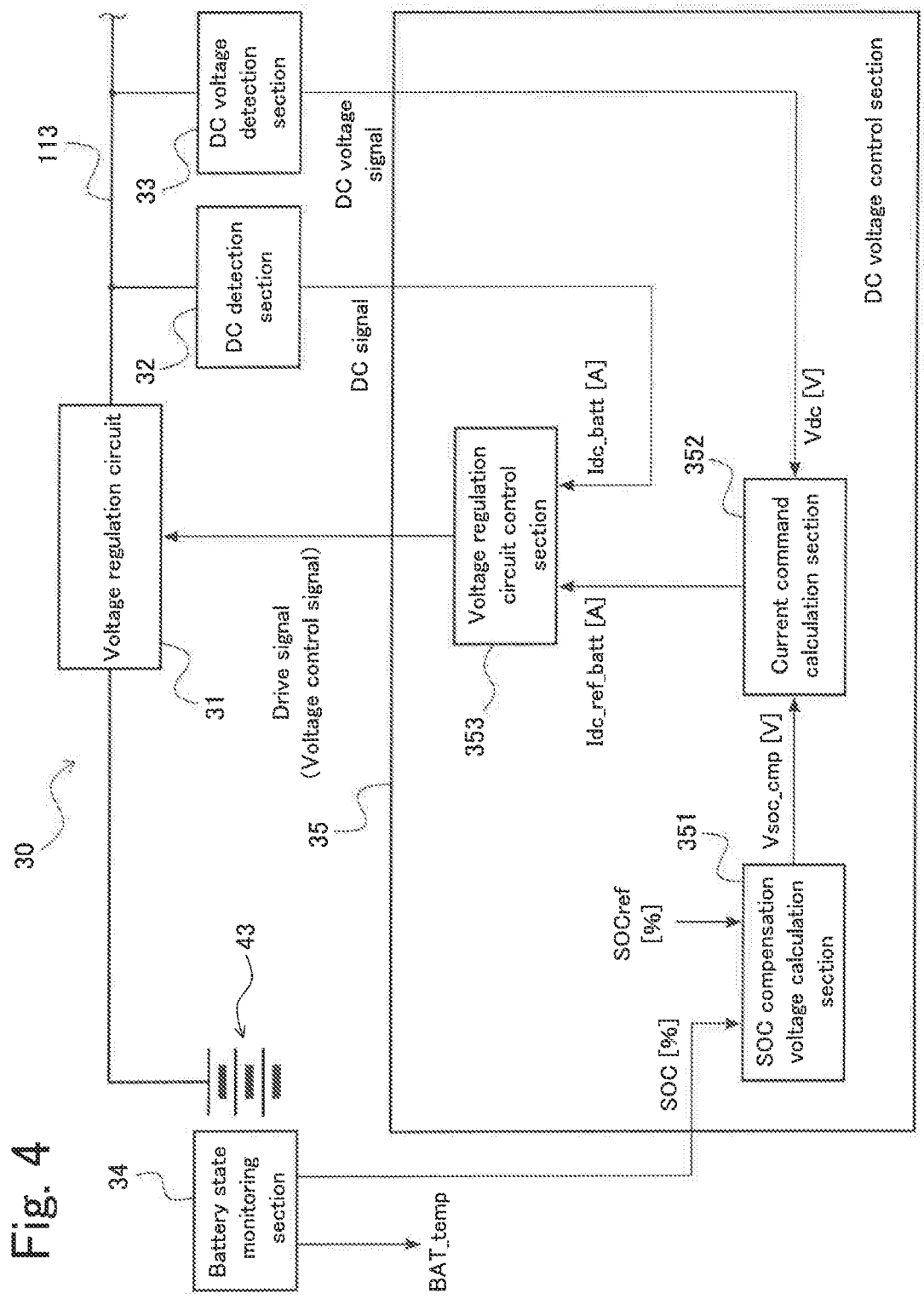
FIG. 4 is a block diagram showing an example of the configuration of a boost converter (charging/discharging control section) of a second DC power supply section included in the DC stabilization power supply system of FIG. 1.

Next, an example of the specific configuration of the boost converter 30 constituting the second DC power supply section 13A together with the battery 43 will be described with reference to FIG. 4 and FIGS. 5A and 5B.

As described above, the boost converter 30 functions as the charging/discharging control section which is connected to the battery 43 as the DC power supply and controls the charging and discharging amounts of the DC power supply. The boost converter 30 is also connected to the PWM converter 20 and the DC bus 14 via the DC link 114 (see FIG. 1). As shown in FIG. 4, the boost converter 30 according to the present embodiment includes a voltage regulation circuit 31, a DC detection section 32, a DC voltage detection section 33, a battery state monitoring section 34, a DC voltage control section 35, and the like.

The voltage regulation circuit 31 is connected to the battery 43 (configured as the electric accumulator in the example of FIG. 4), and to the DC link 114 (not shown) via the battery DC wire 113. The voltage regulation circuit 31 controls charging and discharging of the battery 43 under control of the DC voltage control section 35. The specific configuration of the voltage regulation circuit 31 is not particularly limited. For example, a bidirectional boost chopper circuit using a known IGBT, or the like, can be suitably used as the voltage regulation circuit 31.

The DC detection section 32 and the DC voltage detection section 33 are provided on the battery DC wire 113 and detect the DC and the DC voltage, respectively, of the electric system. As shown in FIG. 4, a detection value (DC signal) of the DC and a detection value (DC voltage signal) of the DC voltage are input to the DC voltage control section 35. The battery state monitoring section 34 monitors the state of charge (SOC) of the battery 43 and the battery cell temperature BAT_temp of the battery 43. The battery state monitoring section 34 outputs the SOC to the DC voltage control section 35. The battery state monitoring section 34 outputs the battery cell temperature BAT_temp to the DC voltage command calculation section 254 of the PWM converter 20 (see FIGS. 2 and 3A).

The specific configurations of the DC detection section 32 and the DC voltage detection section 33 are not particularly limited, and a known DC meter and a known DC voltage meter can be suitably used as the DC detection section 32 and the DC voltage detection section 33, respectively. The specific configuration of the battery state monitoring section 34 is not particularly limited. For example, a known SOC detector capable of detection of the SOC, known temperature detector capable of detection of the battery cell temperature, or the like can be suitably used as the battery state monitoring section 34.

The DC voltage control section 35 drives the voltage regulation circuit 31, based on the DC signal, the DC voltage signal, and the SOC. The specific configuration of the DC voltage control section 35 is not particularly limited. In the present embodiment, for example, as shown in FIG. 4, the DC voltage control section 35 includes a SOC compensation voltage calculation section 351, a current command calculation section 352, and a voltage regulation circuit control section 353.

The SOC compensation voltage calculation section 351 calculates a SOC compensation voltage Vsoc_cmp (unit: V) based on the SOC (unit: %) from the battery state monitoring section 34. The current command calculation section 352 calculates a current command value Idc_ref_batt (unit: A) based on the SOC compensation voltage Vsoc_cmp from the SOC compensation voltage calculation section 351 and the DC voltage signal Vdc (unit: V) from the DC voltage detection section 33. The voltage regulation circuit control section 353 generates a drive signal (voltage control signal) for the voltage regulation circuit 31 based on the current command value Idc_ref_batt from the current command calculation section 352 and the DC signal Idc_batt (unit: A) from the DC detection section 32, and outputs the drive signal to the voltage regulation circuit 31. The voltage regulation circuit 31 controls the charging and discharging amounts of the battery 43 in response to the drive signal from the voltage regulation circuit control section 353.

The specific configurations of the SOC compensation voltage calculation section 351, the current command calculation section 352, and the voltage regulation circuit control section 353 are not particularly limited. The SOC compensation voltage calculation section 351, the current command calculation section 352, and the voltage regulation circuit control section 353 may be configured as known logic circuits including switching elements, adders, subtracters, comparators, and the like, or may be functional configurations implemented in such a manner that a processor e.g., CPU) (not shown) operates according to programs stored in a memory (not shown).

Figure 5A:
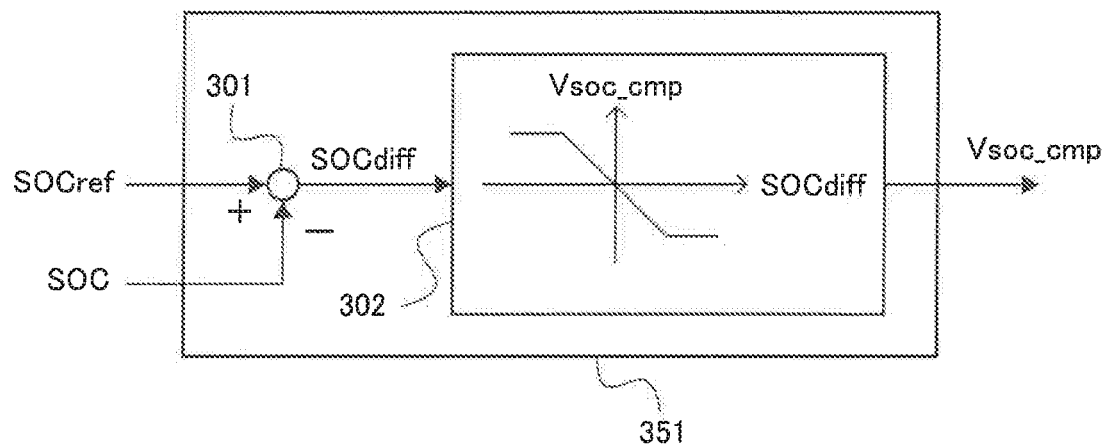
FIG. 5A is a schematic block diagram showing an example of the configuration of a state of charge (SOC) compensation voltage calculation section included in the boost converter of FIG. 4.

FIG. 5A shows an example of the specific configuration of the SOC compensation voltage calculation section 351. FIG. 5B shows an example of the specific configuration of the current command calculation section 352. As shown in FIG. 5A, the SOC compensation voltage calculation section 351 includes a subtracter 301 and an upper/lower limiter 302. The subtracter 301 subtracts the SOC of the battery 43 from the battery state monitoring section 34 from a preset target value SOCref (unit %) of the SOC. The subtracter 301 outputs the resulting subtraction value (deviation) SOCdiff to the upper/lower limiter 302. The upper/lower limiter 302 generates the SOC compensation voltage Vsoc_cmp based on the subtraction value SOCdiff, and outputs the SOC compensation voltage Vsoc_cmp to the current command calculation section 352.

Figure 5B:
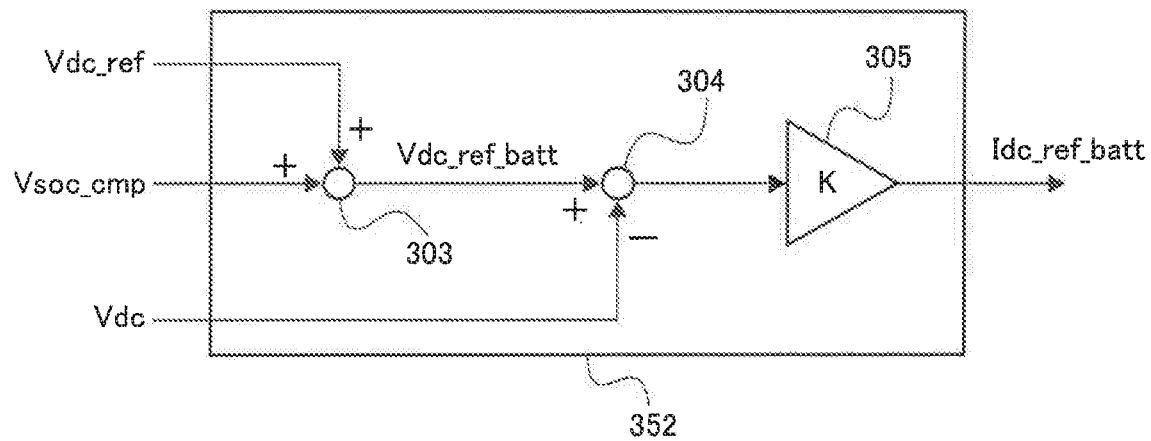
FIG. 5B is a schematic block diagram showing an example of the configuration of a current command calculation section included in the boost converter of FIG. 4.

As shown in FIG. 5B, the current command calculation section 352 includes an adder 303, a subtracter 304, and a proportional controller 305. The adder 303 adds a preset DC voltage reference value Vdc_ref (unit: V) to the SOC compensation voltage Vsoc_cmp from the SOC compensation voltage calculation section 351. The resulting addition value is a DC voltage command value Vdc_ref_batt (unit: V). The subtracter 304 subtracts the DC voltage signal Vdc from the DC voltage detection section 33, from the DC voltage command value Vdc_ref_batt. The proportional controller 305 generates a current command value Idc_ref_batt by multiplying the resulting subtraction value (deviation) by a preset proportional gain K, and outputs the current command value Idc_ref_batt to the voltage regulation circuit control section 353.

As described above, the current command calculation section 352 calculates the current command value Idc_ref ban by the P control based on the SOC compensation voltage Vsoc_cmp and the DC voltage signal Vdc, and the voltage regulation circuit control section 353 generates the drive signal (voltage control signal) based on the current command value Idc_ref_batt. The voltage regulation circuit 31 is driven by this drive signal and controls charging and discharging of the battery 43. With this control, in a case where the DC voltage is constant, the boost converter 30 does not charge or discharge the battery 43, while in a case where the DC voltage changes by the control of the PWM converter 20, the boost converter 30 controls the charging and discharging amounts of the battery 43, according to a change amount (change of the DC voltage or a deviation from the reference value). As a result, the charging and discharging amounts of the battery 43 controlled by the boost converter 30 (charging/discharging control section) is controlled by regulation of the DC voltage which is performed by the PWM converter 20 (power conversion section).

If the current command calculation section 352 continues to perform the P control, then the charging amount of the battery 43 may be gradually decreased, or the battery 43 may be gradually overcharged. In light of this, in the boost converter 30, the battery state monitoring section 34 monitors the SOC of the battery 43, and the SOC compensation voltage calculation section 351 of the DC voltage control section 35 controls the charging amount of the battery 43 based on the SOC.

For example, in a case where the charging amount of the battery 43 is less, the subtraction value (deviation) SOCdiff becomes large, and the SOC compensation voltage Vsoc_cmp becomes relatively small. As a result, the DC voltage control section 35 generates the drive signal so that the battery 43 is charged. The voltage regulation circuit 31 is driven by this drive signal to charge the battery 43. At this time, the DC voltage of the electric system remains maintained, and as a result, the DC voltage of the battery 43 becomes relatively small. Therefore, charging of the battery 43 can be proceeded. On the other hand, in a case where the battery 43 is in an overcharged state, the voltage regulation circuit 31 is driven by the DC voltage control section 35 to increase the DC voltage, and the battery 43 is discharged to supply the electric power to the electric system. Since the battery state monitoring section 34 monitors the battery cell temperature of the battery 43, the power conversion control section 25 can control the charging and discharging amounts of the battery 43 by changing a target voltage value of the DC bus 14 based on the temperature condition monitored by the battery state monitoring section 34.

Figure 6:
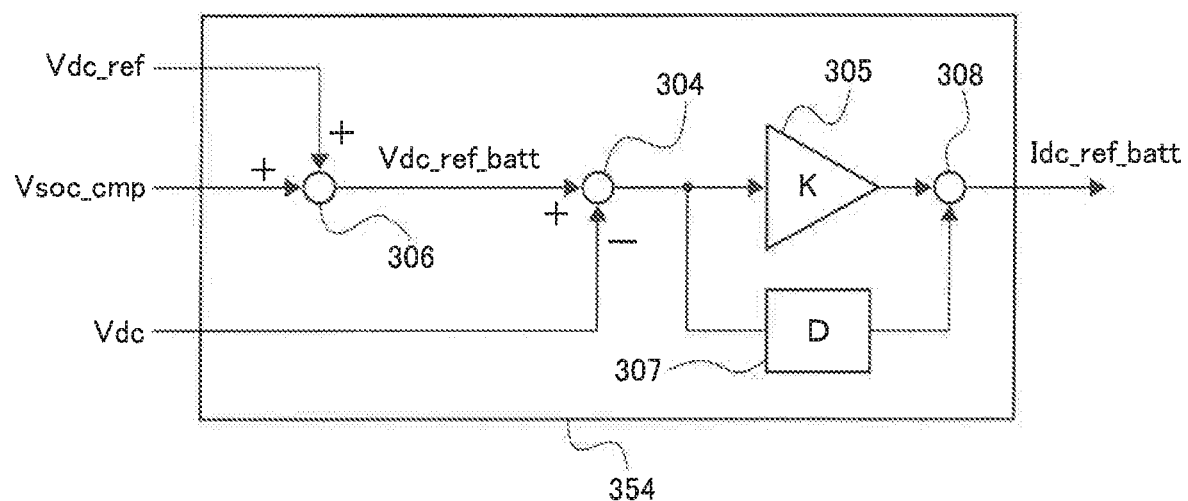
FIG. 6 is a schematic block diagram showing a modified example of the current command calculation section of FIG. 5B.

As shown in FIG. 6, for the purpose of improvement of a responsivity in the proportional control (F control) performed by the current command calculation section 352, a derivative controller 307 may be provided together with the proportional controller 305. As shown in FIG. 6, a current command calculation section 354 includes a first adder 306, a subtracter 304, the proportional controller 305, the derivative controller 307, and a second adder 308.

In the current command calculation section 354, as in the case of the adder 303 of FIG. 5B, the first adder 306 adds the DC voltage reference value Vdc_ref to the SOC compensation voltage and outputs the DC voltage command value Vdc_ref_batt which is an addition value to the subtracter 304. The subtracter 304 subtracts the DC voltage signal Vdc from the DC voltage command value Vdc_ref_batt. The subtracter 304 outputs the subtraction value to the proportional controller 305 and the derivative controller 307. As described above, the proportional controller 305 generates the multiplication value (current command value Idc_ref_batt) by multiplying the subtraction value by the preset proportional gain K. The derivative controller 307 differentiates the subtraction value and outputs a differential value to the second adder 308. The second adder 308 adds the differential value from the derivative controller 307 to the multiplication value from the proportional controller 305.

As described above, the current command calculation section 354 of FIG. 6 calculates the current command value Idc_ref_batt by performing the P control and the D control in parallel, based on the SOC compensation voltage Vsoc_cmp and the DC voltage signal Vdc. This makes it possible to improve a responsivity to a rapid voltage change, compared to the current command calculation section 352 of FIG. 5B. Not to mention, the current command calculation section 354 of FIG. 6 can be replaced by the current command calculation section 352 (namely, configuration of FIG. 5B) included in the boost converter 30 of FIG. 4.

[Electric System Stabilization Method]

Next, an example of an electric system stabilization method performed by the DC stabilization power supply system 10A having the above-described configuration will be specifically described with reference to FIGS. 7 to 9. The electric system stabilization method defined herein includes adjusting by the PWM converter 20, the amount of the power supply stabilization operation to be performed by the first DC power supply section 12A and the amount of the power supply stabilization operation to be performed by the second DC power supply section 13A, as well as performing be power supply stabilization operations by the first DC power supply section 12A and the second DC power supply section 13A. Graphs of FIGS. 7 to 9 indicate examples of a control mode, respectively, of the electric system stabilization method. In these graphs, a vertical axis indicates the DC voltage command value Vdc_ref_gen which is the reference value of the DC voltage, and a horizontal axis indicates the active power Pgen.

(1) Control Mode 1

Initially, a control mode 1 used in the DC stabilization power supply system 10A according to the present embodiment will be described. In the control mode 1 of FIG. 7, the two DC power supply sections 12A, 13A of the DC stabilization power supply system 10A perform a control for maintaining the DC voltage of the electric system at a reference value (e.g., 270V), as a normal control.

In the PWM converter 20 (power conversion section) of the first DC power supply section 12A, the current command calculation section 255 calculates the current command value Id_ref_gen of the d-axis by the PI control (the PI controller 202). Thus, the PI control is performed to maintain the DC voltage at a constant value. With the PI control, the voltage can be maintained at a constant value. In a case where the boost converter 30 detects a voltage change in the DC bus 14, the boost converter 30 can supply the electric power from the battery 43 (discharges the battery 43) according to a change amount of the DC voltage (deviation of the DC voltage).

In the normal control in the control mode 1, the second DC power supply section 13A including the battery 43 performs the stabilization control, for a change in the electric power for a very short time period, all of Which cannot be absorbed by the first DC power supply section. 12A including the generator 42, while the first DC power supply section 12A performs the stabilization control for a change in the electric power for a long time period, which is other than the change in the electric power for a very short time period. Further, in the control mode 1, in a case where a great change in the electric power which falls outside a preset range occurs, the second DC power supply section 13A including the battery 43 is caused to positively absorb the change in the electric power.

The power conversion control section 25 of the PWM converter 20 calculates the DC voltage command value Vdc_ref_gen based on the active power Pgen (DC voltage command calculation section 254). For a change in the electric power in which the value of the active power Pgen falls within a predetermined range, the PWM converter 20 may perform the above-described normal control. On the other hand, for a change in the electric power in which the value of the active power Pgen falls outside the predetermined range, the PWM converter 20 performs a control based on the active power Pgen at that point of time so that the DC voltage changes from the reference value.

As descried above, the PWM converter 20 indirectly controls the charging and discharging amounts of the battery 43 which are controlled by the boost converter 30. In brief, the PWM converter 20 controls the operation of the second DC power supply section 13A including the battery 43 and the boost converter 30, in addition to the operation of the first DC power supply section 12A including the PWM converter 20.

Specifically, the DC voltage control section 35 of the boost converter 30 calculates the current command value Idc_ref_batt based on the DC voltage signal Vdc by the proportional control (current command calculation section 352). In a case where the PWM converter 20 increases the reference value of the DC voltage, the boost converter 30 controls the charging and discharging amounts of the battery 43 so that DC voltage is reduced. On the other hand, in a case where the PWM converter 20 reduces the reference value of the DC voltage, the boost converter 30 controls charging and discharging amounts of the battery 43 so that. DC voltage is increased.

Figure 7:
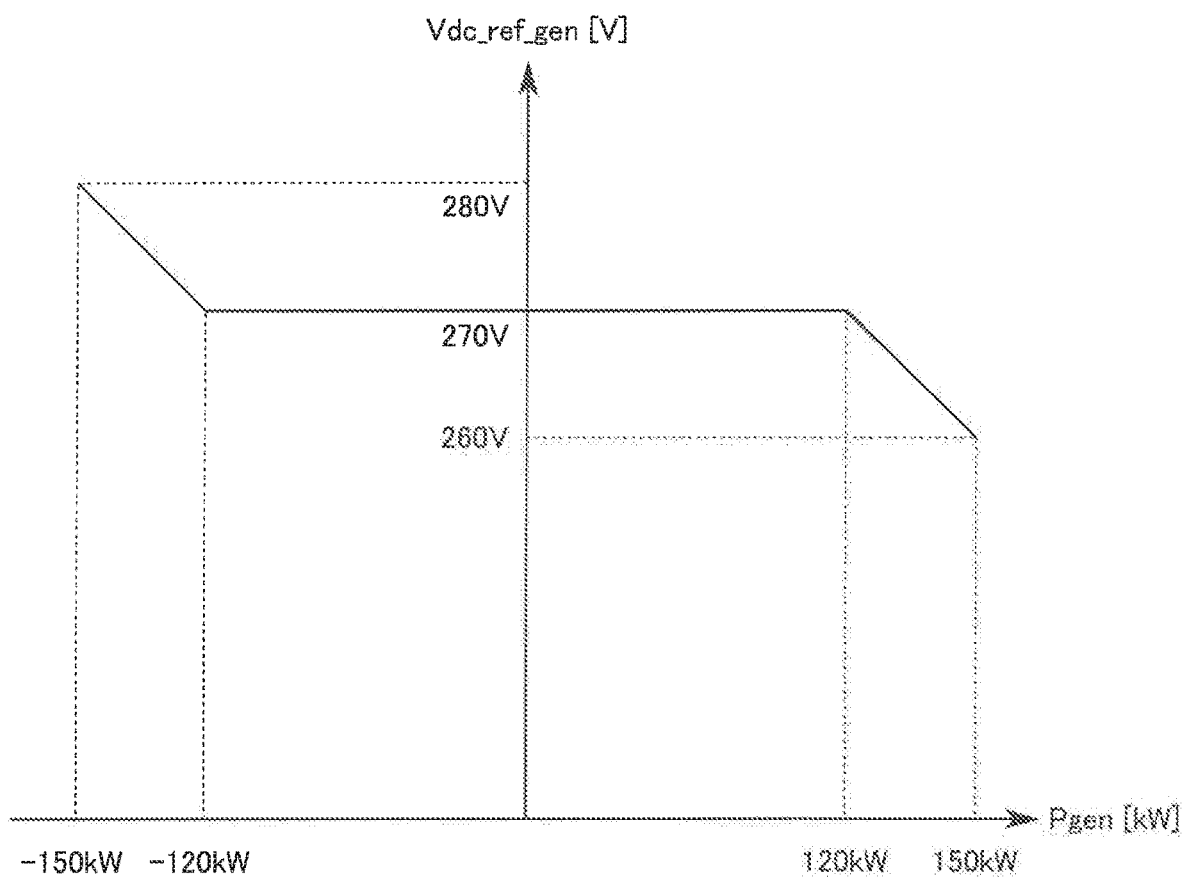
FIG. 7 is a graph showing an example of a control mode in which an electric system is stabilized by the DC stabilization power supply system of FIG. 1.

For example, in the example of FIG. 7, a limit value of the change in the electric power is set to ±120 kW (active power Pgen=−120 kW~+120 kW is the predetermined range) and it is assumed that the change in the electric power (increase in a power load) which is, for example, the active power Pgen±+150 kW has occurred. At this time, the PWM converter 20 reduces the reference value (the DC voltage command value Vdc_ref_gen) of the DC voltage, from 270V to 260V. The boost converter 30 discharges (supplies) the electric power corresponding to the change amount of −10V from the battery 43. For example, in another case where the change in the electric power (generation of regenerative power) which is active power Pgen=−150 kW, has occurred, the PWM converter 20 increases the reference value of the DC voltage from 270V to 280V. The boost converter 30 charges the battery 43 with the electric power corresponding to the change amount of +10V (causes the battery 43 to absorb the electric power).

As described above, in the control mode 1, the first DC power supply section 12A including the generator 42 mainly performs the power supply stabilization operation. However, in a case where the power supply stabilization operation performed by the first DC power supply section 12A is insufficient, depending on the kind of the engine in which the generator 42 is mounted, or the situation, the PWM converter 20 adjusts the amount of the power supply stabilization operation to be performed by the first DC power supply section 12A and the amount of the power supply stabilization operation to be performed by the second DC power supply section 13A so that the second DC power supply section 13A including the battery 43 performs the power supply stabilization operation.

(2) Control Mode 2

Figure 8:
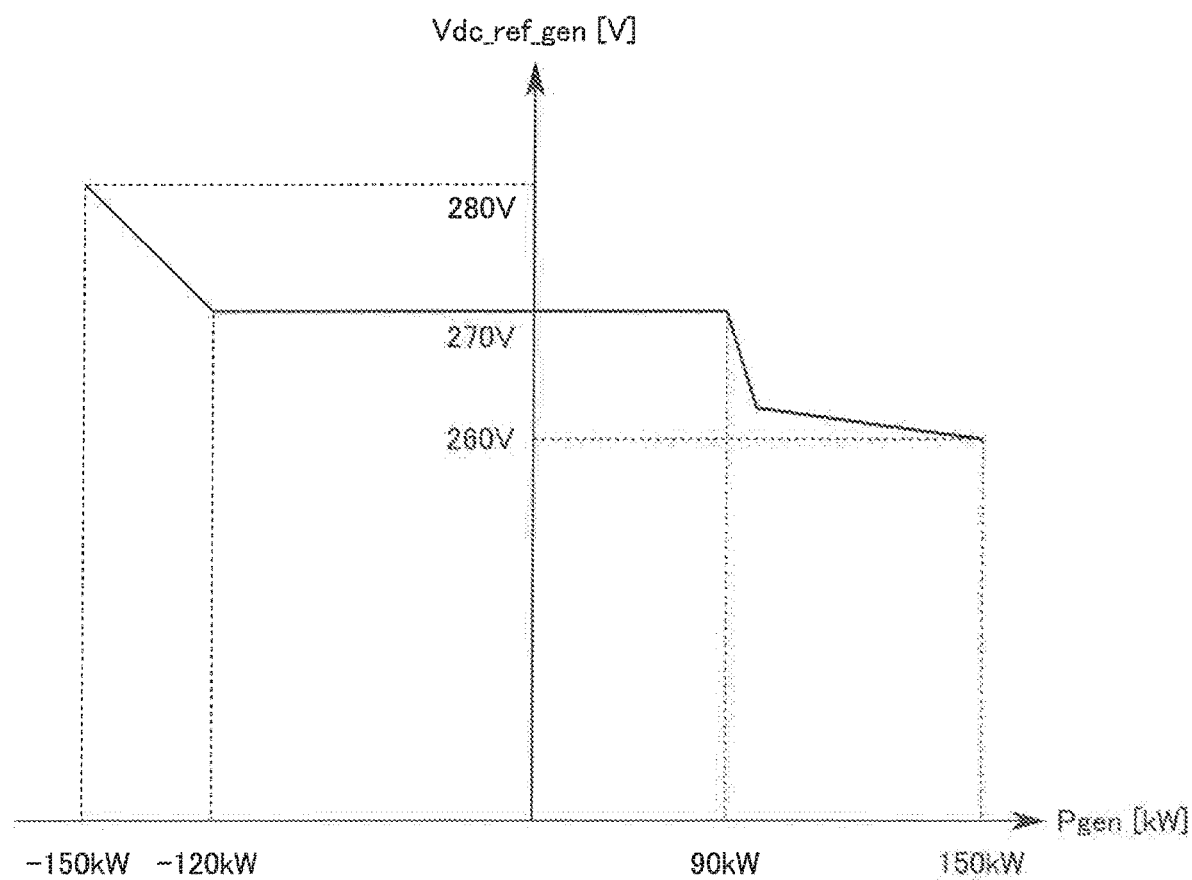
FIG. 8 is a graph showing another example of the control mode in which the electric system is stabilized by the DC stabilization power supply system of FIG. 1.

A control mode 2 of FIG. 8 is a control mode set in view of an idle state of the engine in which the generator 42 is mounted. As in the case of the control mode 1, in the control mode 2, the battery 43 is caused to operate to positively absorb the change in the electric power, if the change in the electric power occurs when a preset condition (the idle state of the engine) is met.

As described above, the generator 42 is mounted in the engine of the aircraft. In a state in which the engine is idle, the rotational speed of the generator 42 is reduced. In this case, if a relatively large change (increase) in the electric power occurs, it is difficult for the generator 42 to absorb this change. In light of this, a limit value of the change in the electric power corresponding to the idle state of the engine is set, and the PWM converter 20 decreases the DC voltage at a high rate, if the change (increase) in the electric power which exceeds this limit value occurs.

For example, in the example of FIG. 8, an upper limit value of the change in the electric power corresponding to the idle state of the engine is set to +90 kW, and it is assumed that the change in the electric power of +150 kW occurs in a state in which the engine is idle. At this time, the PWM converter 20 quickly reduces the reference value (the DC voltage command value Vdc_ref_gen) of the DC voltage from 270V. The boost converter 30 discharges (supplies) the electric power corresponding to the rapid change amount of the DC voltage from the battery 43. By setting the control mode 2, in a state in which the engine is idle, the battery 43 can deal with even the change in the electric power which can be dealt with by the generator 42 in the control mode 1.

As described above, in the control mode 2, the limit of the output of the generator 42 is set, and the PWM converter 20 adjusts the amount of the power supply stabilization operation to be performed by the first DC power supply section 12A and the amount of the power supply stabilization operation to be performed by the second DC power supply section 13A including the battery 43 as follows. In a case where the output of the generator 42 is less than (or equal to or less than) the set limit, the first DC power supply section 12A including the generator 42 mainly performs the power supply stabilization operation. On the other hand, in a case where the output of the generator 42 is equal to or greater than (or exceeds) the set limit, the second DC power supply section 13A including the battery 43 positively performs the power supply stabilization operation.

(3) Control Mode 3

Figure 9:
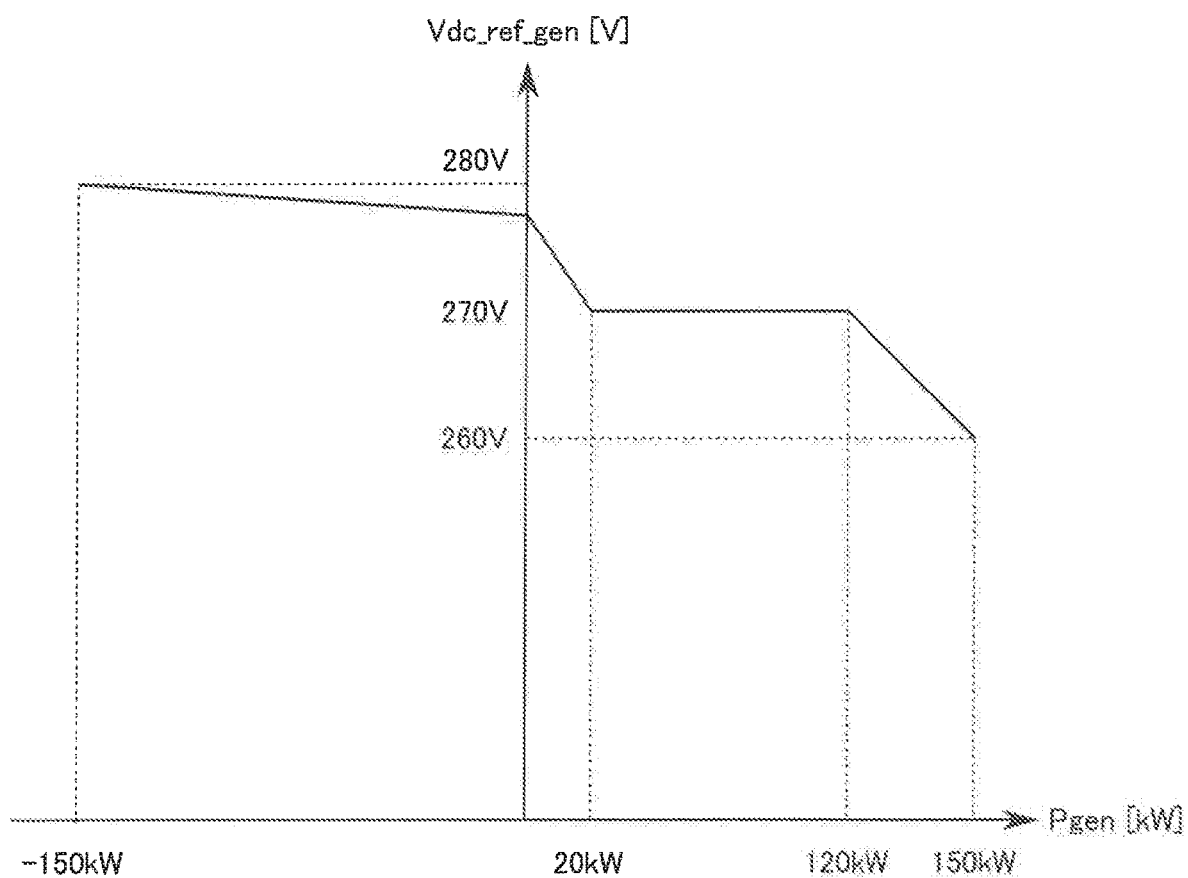
FIG. 9 is a graph showing another example of the control mode in which the electric system is stabilized by the DC stabilization power supply system of FIG. 1.

A control mode 3 of FIG. 9 is a control mode in which absorption of the regenerative power in the generator 42 is limited. For example, in a case where the engine and the generator 42 do not sufficiently deal with (handle) the backlash, the generator 42 cannot sufficiently absorb the regenerative power. In light of this, in a case where generation of the regenerative power occurs, the PWM converter 20 increases the reference value of the DC voltage so that the battery 43 mainly absorbs the regenerative power.

For example, in the example of FIG. 9, the active power Pgen=+20 kW is set as a threshold at which the DC voltage is increased. In a case where the generation of the regenerative power occurs, the PWM converter 20 quickly increases the DC voltage at a relatively high rate from 270V, for a period (first period) which passes until the active power Pgen reaches 0 from a time point when the active power Pgen being monitored has fallen below the threshold. With this voltage increase, the battery 43 absorbs the regenerative power by the operation of the boost converter 30 (charging/discharging control section).

For a period (second period) which passes after the active power Pgen has reached 0, the PWM converter 20 increases the DC voltage at a relatively low rate (gradually) until the DC voltage reaches 280V. The second period is set so that the generator 42 also absorbs a portion of the regenerative power, which cannot be absorbed by the battery 43.

As described above, in the control mode 3, the PWM converter 20 adjusts the amount of the power supply stabilization operation to be performed by the first DC power supply section 12A including the generator 42 and the amount of the power supply stabilization operation to be performed by the second DC power supply section 13A including the battery 43 so that the second DC power supply section 13A mainly performs the power supply stabilization operation, in a case where the first DC power supply section 12A cannot sufficiently perform the power supply stabilization operation.

Although the above-described control modes 1 to 3 are set to deal with the change in the electric power based on the preset conditions (e.g., operation condition or use condition of the engine, etc.), the present invention is not limited to this. For example, as another control mode, there is a control mode set based on the state of the battery as the preset condition.

As the battery 43, for example, a lithium-ion secondary battery can be used. It is generally known that the charging characteristics of the lithium-ion secondary battery are degraded in an environment in which the temperature is equal to or lower than 0 degree C. In this situation, it may be difficult for the battery 43 to absorb the regenerative power or supply the electric power to the power load. In light of this, in a room temperature environment, the PWM converter 20 may execute one of the control modes 1 to 3, while in a low-temperature environment, a control mode in which the generator 42 mainly deals with the Change in the electric power may be used.

As described above, in accordance with the present embodiment, the PWM converter 20 controls the DC voltage by use of the operation information (e.g., the rotational speed ωs_gen) of the generator 42 which is the AC power supply, and the change in the active power. In a case where the PWM converter 20 changes the DC voltage, the boost converter 30 controls the charging and discharging amounts of the battery 43 which is the DC power supply to correspond to the change amount. Therefore, in a case where the generator 42 can deal with the change in the electric power, the PWM converter 20 maintains the DC voltage at the reference value, and the boost converter 30 does not charge or discharge the DC power supply. In a case where it is difficult for the generator 42 to deal with the change in the electric power, the PWM converter 20 changes the DC voltage from the reference value. The boost converter 30 causes the battery 30 to absorb the change in the electric power in response to the change in the DC voltage.

For example, in a case where the PWM converter 20 determines that the generator 42 can absorb the regenerative power based on the operation information and a degree of the increase in the active power, the PWM converter 20 maintains the DC voltage at the reference value and causes the generator 42 to absorb the regenerative power. On the other hand, in a case where the PWM converter 20 determines that it is difficult for the generator 42 to absorb the regenerative power based on the operation information and the change in the active power, the PWM converter 20 increases the DC voltage. In response to this, the boost converter 30 charges the battery 43, and thus the battery 43 absorbs the regenerative power.

For example, in a case where the PWM converter 20 determines that the generator 42 can sufficiently supply the electric power based on the operation information and a degree of the decrease in the active power, the PWM converter 20 maintains the DC voltage at the reference value, and supplies the electric power from the generator 42 to the electric system. On the other hand, in a ease where the PWM converter 20 determines that it is difficult for the generator 42 to sufficiently supply the electric power based on the operation information and the degree of the decrease in the active power, the PWM converter 20 decreases the DC voltage from the reference voltage. In response to this, the boost converter 30 discharges the battery 43, and thus the battery 43 supplies the electric power to the electric system.

The electric system includes the first DC power supply section 12A and the second DC power supply section 13A. Each of the first DC power supply section 12A and the second DC power supply section 13A performs the power supply stabilization operation. In other words, the power supply stabilization operation can be shared (divided) by two paths which are a path in which the generator 42 deals with the change in the electric power (the path of the first DC power supply section 12A) and a path in which the battery 43 deals with the change in the electric power (the path of the second DC power supply section 13A). The PWM converter 20 is able to adjust the amount of the power supply stabilization operation to be performed by the first DC power supply section 12A and the amount of the power supply stabilization operation to be performed by the second DC power supply section 13A, depending on the situation of the electric system. Therefore, it becomes possible to well absorb the change in the electric power without a need to increase the size of the power supply device such as the generator 42 or the battery 43, or the converter connected to the power supply device.

As a result, the size of the power supply device or the converter is not increased. Therefore, an increase in the weight of the aircraft can be avoided, and the electric device such as the electric actuator, which may possibly generate the regenerative power, can be easily used. Further, the path for dealing with the change in the electric power can be changed depending on the situation. In this way, electric energy can be efficiently used.

In the present embodiment, in particular, the PWM converter 20 which is the power conversion section controls adjustment of the amounts of the power supply stabilization operations, by the PI control, and the boost converter 30 which is the charging/discharging control section controls the charging and discharging amounts by the P control. In this configuration, preference is given to the control performed by the PWM converter 20 over the control performed by the boost converter 30. This means that the PWM converter 20 indirectly controls the boost converter 30 based on the change in the voltage of the DC bus 14. As a result, the PWM converter 20 can well control the adjustment of the amount of the power supply stabilization operation to be performed by the first DC power supply section 12A and the amount of the power supply stabilization operation to be performed by the second DC power supply section 13A.

The PWM converter 20 calculates the AC command value, based on at least the change in the voltage of the DC bus 14, by the PI control, and controls the generator 42 by use of this AC command value. With this control, the target value of the electric power to be generated by the generator 42 can be changed depending on the situation. As a result, the first DC power supply section 12A which mainly performs the power supply stabilization operation can be well controlled depending on the situation. In this way, the PWM converter 20 can better control adjustment of the amount of the power supply stabilization operation to be performed by the first DC power supply section 12A and the amount of the power supply stabilization operation to be performed by the second DC power supply section 13A.

Embodiment 2

In Embodiment 1 described above, the DC stabilization power supply system 10A includes the first DC power supply section 12A and the second DC power supply section. 13A, as the DC power supply sections. The present invention is not limited to this configuration, and a DC stabilization power supply system may include three or more DC power supply sections.

Figure 10:
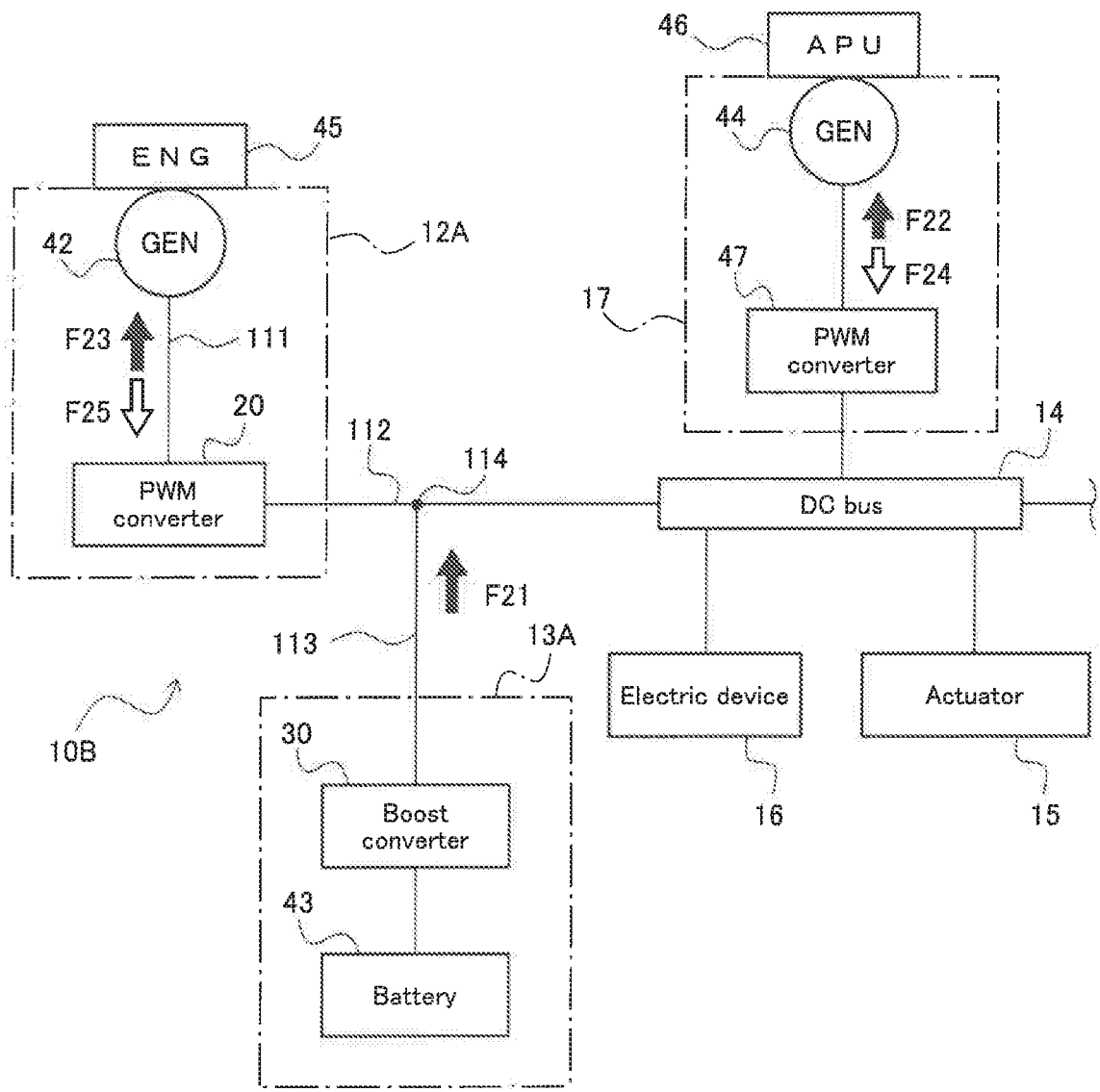
FIG. 10 is a block diagram showing an example of the configuration of a DC stabilization power supply system according to Embodiment 2 of the present invention.

As shown in FIG. 10, as in the DC stabilization power supply system 10A according to Embodiment 1, a DC stabilization power supply system. 10B according to Embodiment 2 includes the electric system (the DC bus 14, the actuator 15 and the electric device 16 connected to the DC bus 14, etc.), the first DC power supply section 12A (including the PWM converter 20 and the generator 42), and the second DC power supply section 13A (including the boost converter 30 and the battery 43). In addition, the DC stabilization power supply system 10B includes a third DC power supply section 17. The third DC power supply section 17 includes a auxiliary power unit (APU) generator 44 and a PWM converter 47.

The APU generator 44 is an AC power supply mounted in an auxiliary power unit (APU) 46 of the aircraft (not shown). The APU 46 is an auxiliary power source mounted separately from an engine 45 of the aircraft, and is operative by combustion of fuel as in the engine 45. The PWM converter 47 functions as an "APU power conversion section" which converts the AC power from the APU generator 44 into the DC power, and converts the DC power from the DC bus 14 into the AC power.

In the present embodiment, the APU 46 included in the aircraft is capable of being started by the second DC power supply section 13A. When the APU 46 is started, the APU generator 44 generates the electric power, and the engine 45 is started by the electric power supplied from the third DC power supply section 17. In this state, the generator 42 mounted in the engine 45 starts to generate the electric power. Therefore, the second DC power supply section 13A is configured to perform the power supply stabilization operation, and also serves as a "power supply for starting APU."

For example, as indicated by a block arrow F21 in FIG. 10, the boost converter 30 of the second DC power supply section 13A discharges the battery 43. Thereby, the electric power for starling the APU generator 44 is supplied to the APU generator 44 via the DC bus 14 and the PWM converter 47, as indicated by a block arrow F22. By the electric power, the APU generator 44 is started. Therefore, the AC power is supplied from the APU generator 44 to the PWM converter 47 as indicated by a block arrow F24 of FIG. 10. Then, the PWM converter 47 converts the AC power into the DC power. As a result, the electric power is supplied from the third DC power supply section 17 to the DC bus 14 (electric system).

The electric power from the third DC power supply section 17 is supplied to the engine generator 42 as indicated by a block arrow 123 via the DC bus 14, the DC link 114, and then the PWM converter 20. By this electric power, the engine generator 42 is started, and hence the engine 45 is started by the electric power supplied from the engine generator 42. Thereby, as indicated by a block arrow F25 of FIG. 10, the AC power is supplied from the engine generator 42 to the PWM converter 20, and the PWM converter 20 converts the AC power into the DC power. As a result, the electric power is supplied from the first DC power supply section 12A to the DC bus 14 (electric system) via the DC link 114.

As described above, in the present embodiment, the DC stabilization power supply system 10B includes the engine generator 42 and the APU generator 44 as the AC power supplies. When the engine generator 42 or the APU generator 44 does not supply the electric power to the DC bus 14, the second DC power supply section 13A supplies the electric power to the DC bus 14 (namely, the second DC power supply section 13A serves as an "emergency power supply or a power supply for starting APU"). When the engine 45 is started, the first DC power supply section 12A operates as a "motor controller and a motor for starting the engine", by the electric power supplied from the engine generator 42 or the APU generator 44 (the third DC power supply section 17).

The PWM converter 47 of the third DC power supply section 17 controls the adjustment of the amount of the power supply stabilization operation to be performed by the second DC power supply section 13A and the amount of the power supply stabilization operation to be performed by the third DC power supply section 17. For example, the control modes 1 to 3 described in Embodiment 1 can be used in a combination of the DC power supply sections 13A, 17, as well as a combination of the DC power supply sections 12A, 13A.

For example, in the control mode 1, the PWM converter 47 of the third DC power supply section 17 increases or decreases a preset reference value of the DC voltage. In this case, the boost converter 30 of the second DC power supply section 13A controls the charging and discharging amounts of the battery 43 to decrease or increase the DC voltage, to correspond to the increase or decrease in the reference value (see FIG. 7).

In the control mode 2, in a case where the limit value of the change in the electric power of the APU generator 44 is preset, the PWM converter 47 of the third DC power supply section 17 changes the DC voltage at a high rate, if the change in the electric power which exceeds the limit value occurs. In this case, the boost converter 30 of the second DC power supply section 13A controls the charging and discharging amounts of the battery 43 to supply the electric power corresponding to the change amount of the DC voltage which is changed by the PWM converter 47 (see FIG. 8).

In the control mode 3, the PWM converter 47 of the third DC power supply section 17 is configured to monitor the active power of the APU generator 44, as in the PWM converter 20 of the first DC power supply section 12A. In a case where the reference value of the DC voltage of the electric system and the threshold of the active power are preset, the PWM converter 47 of the third DC power supply section 17 increases the DC voltage at a high rate for the first period which passes until the active power reaches 0, from a time point when the active power being monitored has fallen below the threshold, and then gradually increases the DC voltage until the active power reaches the reference value, for the second period which passes after the active power has reached 0. The boost converter 30 of the second DC power supply section 13A controls the charging and discharging amounts of the battery 43 to charge the battery 43 with the DC power corresponding to the amount of DC voltage Which is increased by the PWM converter 47.

As described above, in the present embodiment, the DC stabilization power supply system 10B includes the third DC power supply section 17 in addition to the first DC power supply section 12A and the second DC power supply section 13A, and the third DC power supply section 17 includes at least the APU generator 44 and the APU power conversion section (the PWM converter 47). In this configuration, the APU power conversion section of the third DC power supply section 17 indirectly controls the boost converter 30 of the second DC power supply section 13A, as in the power conversion section (the PWM converter 20) of the first DC power supply section 12A. As a result, the APU power conversion section well controls the amount of the power supply stabilization operation to be performed by the second DC power supply section 13A and the amount of the power supply stabilization operation to be performed by the third DC power supply section 17.

Embodiment 3

In the DC stabilization power supply system 10A according to Embodiment 1 or the DC stabilization power supply system 10B according to Embodiment 2, the power conversion section (PWM converter 20) of the first DC power supply section 12A or the APU power conversion section (PWM converter 47) of the third DC power supply section 17 controls adjustment of the amounts of the power supply stabilization operations by the proportional-integral control (PI control), and the charging/discharging control section (the boost converter 30) of the second DC power supply section 13A controls the charging and discharging amounts by the proportional control (P control). In contrast, in Embodiment 3, the charging/discharging control section of the second DC power supply section 13A also controls the charging and discharging amounts by the PI control, and a voltage change range within which the charging/discharging control section performs a control and a voltage change range within which the power conversion section performs a control are set to different ones to avoid an overlap between the control performed by the charging/discharging control section and the control performed by the power conversion section.

Figure 11:
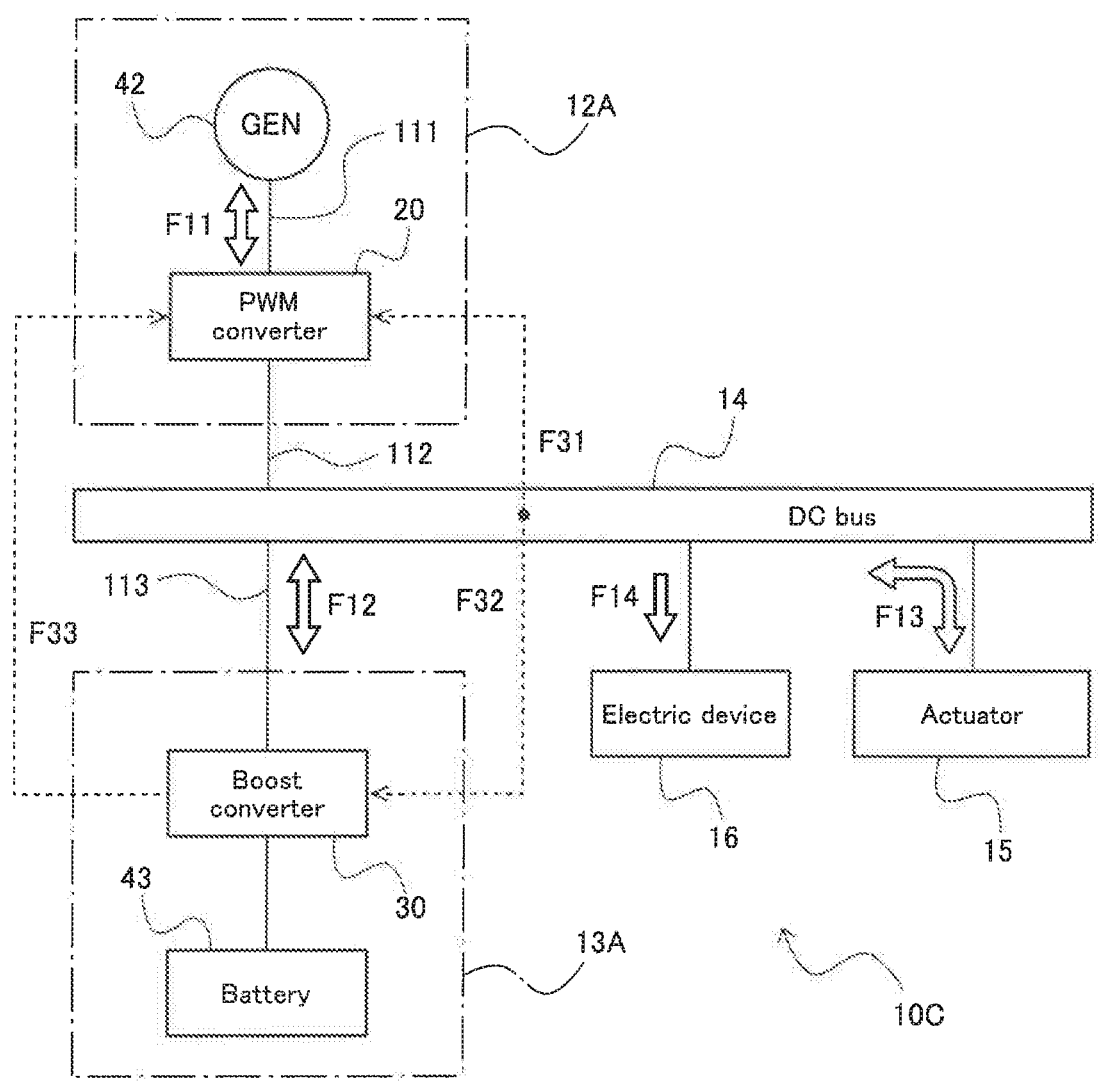
FIG. 11 is a block diagram showing an example of the configuration of a DC stabilization power supply system according to Embodiment 3 of the present invention.

For example, as shown in FIG. 11, a DC stabilization power supply system 10C according to Embodiment 3 has a configuration similar to that of the DC stabilization power supply system 10A according to Embodiment 1. As shown in FIG. 11, the PWM converter 20 of the first DC power supply section 12A and the boost converter 30 of the second DC power supply section 13A monitor a change in the voltage of the DC bus 14, as indicated by dotted arrows F31 and F32, respectively. Although FIG. 11 shows that the first DC power supply section 12A and the second DC power supply section 13A are directly connected to the DC bus 14 without the DC link 114 in the example of FIG. 1, the basic configuration of FIG. 11 is the same as that of Embodiment 1.

The configuration of the PWM converter 20 of the first DC power supply section 12A and the configuration of the boost converter 30 of the second DC power supply section 13A are similar to those of Embodiment 1. The PWM converter 20 has the configuration of FIG. 2, and the boost converter 30 has the configuration of FIG. 4. However, in the present embodiment, the PWM converter 20 includes a current command calculation section 257 having a configuration of FIG. 12A instead of the current command calculation section 255 of FIG. 3B. The boost converter 30 includes a current command calculation section 355 of FIG. 12B instead of the current command calculation section 352 of FIG. 5B or the current command calculation section 354 of FIG. 6.

Figure 12A:
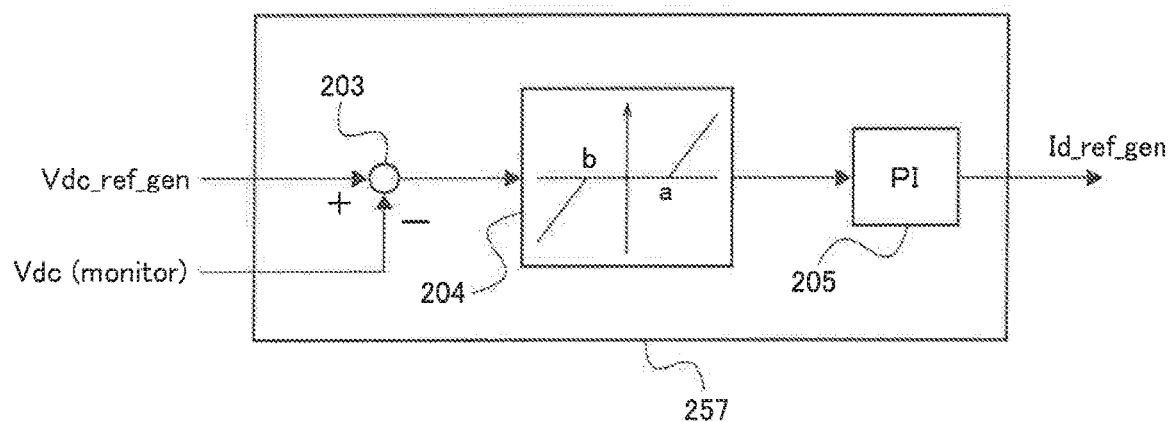
FIG. 12A is a schematic block diagram showing an example of the configuration of a current command calculation section of the PWM converter (power conversion section of the first DC power supply section) included in the DC stabilization power supply system of FIG. 11.

As shown in FIG. 12A, the current command calculation section 257 includes a subtracter 203, a dead band 204, and a PI controller 205. The subtracter 203 subtracts the DC voltage signal Vdc (monitor) which is a monitored voltage of the DC bus 14, from the DC voltage command value Vdc_ref_gen calculated by the DC voltage command calculation section 254 (not shown), and outputs the resulting subtraction value (deviation) to the dead band 204.

An upper limit value a and a lower limit value b, corresponding to "sensitivity set values" of the subtraction value are set in the dead band 204. In a case where the input subtraction value falls within a range of a to b, the dead band 204 does not output the subtraction value to the PI controller 205. On the other hand, in a case where the input subtraction value falls outside the range of a to b (the subtraction value exceeds the upper limit value a or falls below the lower limit value b), the dead band 204 outputs an amount of a deviation from the upper limit value a or the lower limit value b to the PI controller 205. The PI controller 205 generates the current command value Id_ref_gen based on the input subtraction value.

Figure 12B:
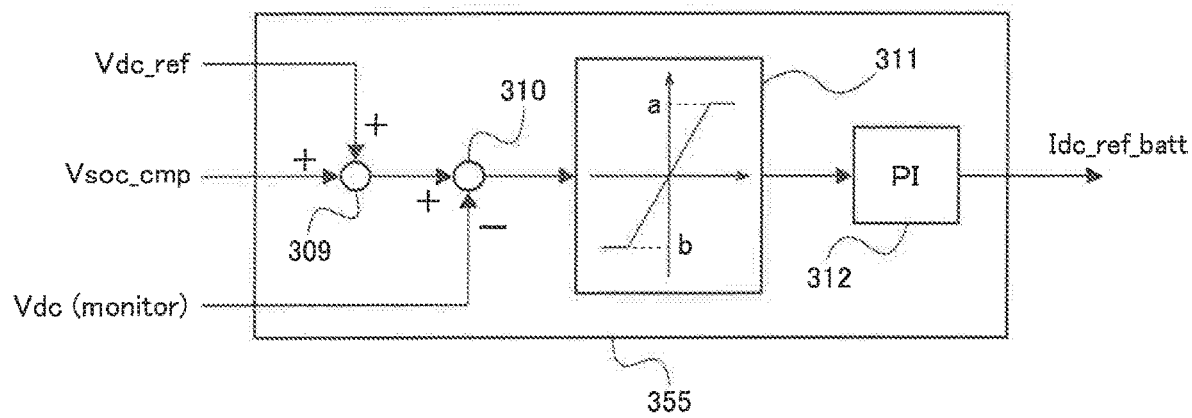
FIG. 12B is a schematic block diagram showing an example of the configuration of a current command calculation section of the boost converter (charging/discharging control section of the second DC power supply section) included in the DC stabilization power supply system of FIG. 11.

As shown in FIG. 12B, the current command calculation section 355 includes an adder 309, a subtracter 310, an upper/lower limiter 311, and a PI controller 312. In the current command calculation section 355, the adder 309 adds the DC voltage reference value Vdc_ref to the SOC compensation voltage Vsoc_cmp and outputs the resulting addition value to the subtracter 310. The subtracter 310 subtracts the DC voltage signal Vdc (monitor) which is the monitored voltage of the DC bus 14, from the input addition value, and outputs the resulting subtraction value to the upper/lower limiter 311.

As in the dead band 204 of the current command calculation section 257, the upper limit value a and the lower limit value b, corresponding to the "sensitivity set values" of the subtraction value are set in the upper/lower limiter 311. In a case where the input subtraction value falls within a range of a to b, the upper/lower limiter 311 outputs the subtraction value to the PI controller 312. On the other hand, in a case where the input subtraction value falls outside the range of a to b (the subtraction value exceeds the upper limit value a or falls below the lower limit value h), the upper/lower limiter 311 outputs the upper limit value a or the lower limit value b to the PI controller 312. The PI controller 312 generates the current command value Idc_ref_batt based on the input subtraction value.

In the DC stabilization power supply system 100 having the above-described configuration, in a case where the monitored voltage of the DC bus 14 is deviated from the DC voltage reference set value, the second DC power supply section 13A including the battery 43 initially performs the power supply stabilization operation. Further, in a case where the amount of a deviation of the monitored voltage exceeds or falls below a range of the sensitivity set values (range of the upper limit value a to the lower limit value b), the first DC power supply section 12A including the generator 42 assists the battery 43 (the second DC power supply section 13A) and performs the power supply stabilization operation. At this time, the boost converter 30 may notify the PWM converter 20 of the sensitivity set values of the monitored voltage, as indicated by a dotted arrow F33 of FIG. 11.

As described above, in the second DC power supply section 13A, the current command calculation section 355 of the boost converter 30 includes the upper/lower limiter 311. The upper/lower limiter 311 is provided to limit a compensation range of the second DC power supply section 13A. Therefore, in the second DC power supply section 13A, the battery 43 is charged or discharged in a range (range of the upper limit value a to the lower limit value b) in which the battery 43 is chargeable or dischargeable. Since the current command calculation section 355 includes the PI controller 312 to generate the current command value Idc_ref_batt, the second DC power supply section 13A can perform the power supply stabilization operation with a higher accuracy.

As described above, in the first DC power supply section 12A, the current command calculation section 257 of the PWM converter 20 includes the dead band 204. In the current command calculation section 257, the dead band 204 is provided so that the generator 42 of the first DC power supply section 12A performs the power supply stabilization operation only when a deviation of the monitored voltage exceeds or falls below a range (namely allowable range of the battery 43) which can be dealt with by the second DC power supply section 13A. Since the current command calculation section 257 includes the PT controller 205 to generate the current command value Id_ref_gen, as in the current command calculation section 355 (and the current command calculation section 255 of Embodiment 1 described above), the first DC power supply section 12A can perform the power supply stabilization operation with a higher accuracy.

As described above, the upper limit value a and the lower limit value b set in the upper/lower limiter 311 of the boost converter 30 are equal to those, respectively, set in the dead band 204 of the PWM converter 20. This makes it possible to avoid a possibility of interference between the control for the power supply stabilization operation which is performed by the boost converter 30 and the control for the power supply stabilization operation which is performed by the PWM converter 20. Although the upper limit value a and the lower limit value b which are the sensitivity set values may be set to values of one pattern (one set), the upper limit value a and the lower limit value b may more preferably be set to values of plural patterns. In a case where the sensitivity set values of the upper limit value a and the lower limit value b are set to the values of plural patterns, flexible power supply stabilization operation corresponding to the situation of the electric system can be performed.

For example, in a case where much discharging of the battery 43 is not preferable, the upper limit value a is set to a smaller value. In a case where charging of the battery 43 is not preferable, the lower limit value b is set to a smaller value. In a case where the charging and discharging amounts of the battery 43 are intended to be increased, the upper limit value a and the lower limit value b are set to larger values, respectively. On the other hand, in a case where the charging and discharging amounts of the battery 43 are intended to be reduced, the upper limit value a and the lower limit value b are set to smaller values, respectively.

Figure 13:
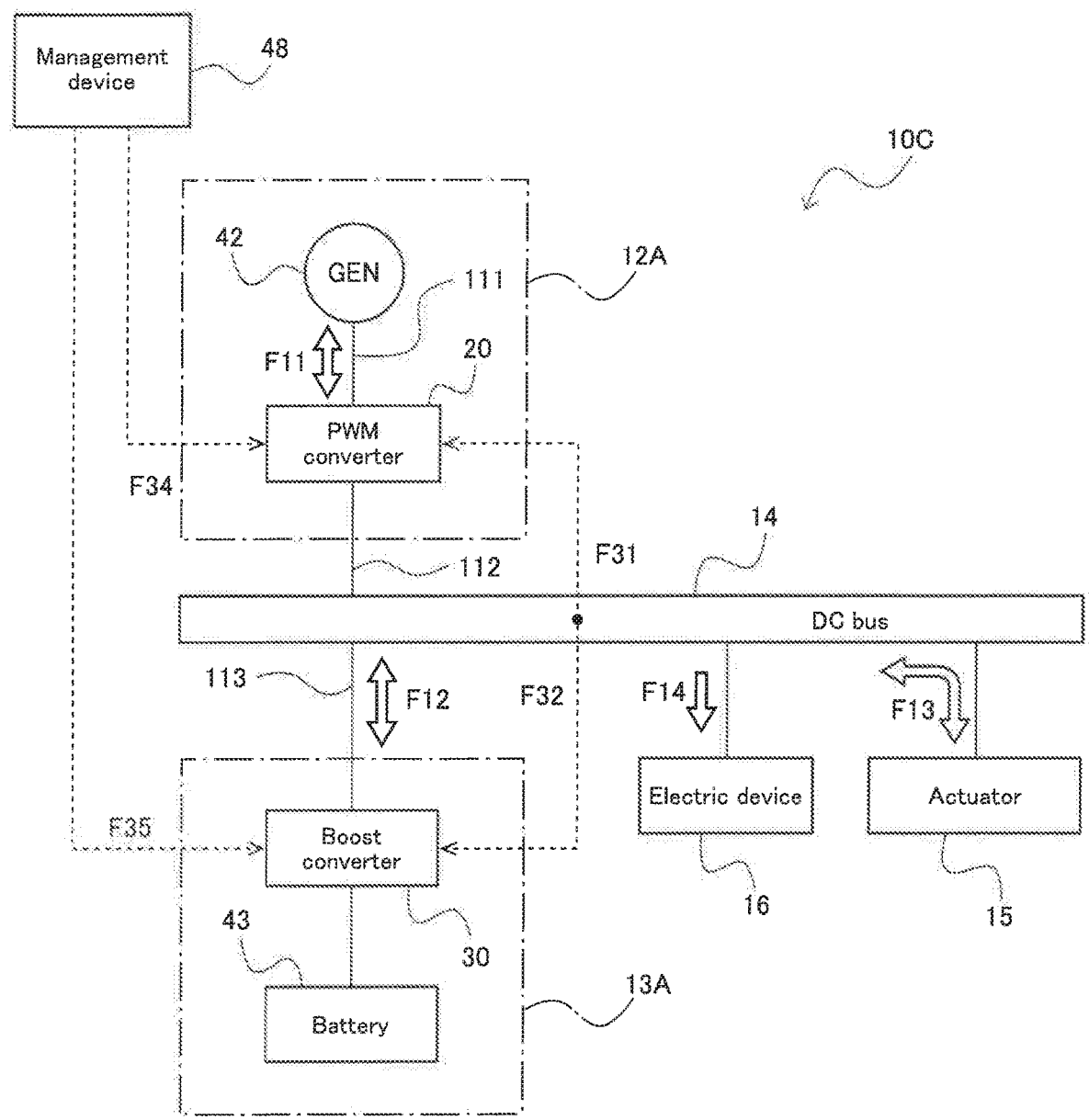
FIG. 13 is a block diagram showing another example of the configuration of the DC stabilization power supply system according to Embodiment 3 of the present invention.

Although in the above-described example, the boost converter 30 (the second DC power supply section 13A) notifies the PWM converter 20 (the first DC power supply section 12A) of the sensitivity set values of the monitored voltage, this is merely exemplary. For example, as shown in FIG. 13, a management device 48 of the aircraft which is an upper controller may set the sensitivity set values a and b. The management device 48 may directly notify the PWM converter 20 (the first DC power supply section 12A) of the sensitivity set values as indicated by a dotted arrow F34, and directly notify the boost converter 30 (the second DC power supply section 13A) of the sensitivity set values as indicated by a dotted arrow F35.

As described above, in the present embodiment, the charging/discharging control section (the boost converter 30) of the second DC power supply section 13A as well as the power conversion section (the PWM converter 20) of the first DC power supply section 12A performs the PI control. The voltage change range within which the control is performed by the charging/discharging control section and the voltage change range within which the control is performed by the power conversion section are preset to different ones, to avoid an overlap between the control performed by the charging/discharging control section and the control performed by the power conversion section. In this setting, the charging/discharging control section and the power conversion section can better control sharing (dividing) of the power supply stabilization operation between the two DC power supply sections 12A, 13A.

Embodiment 4

Although the DC stabilization power supply system 10A according to Embodiment 1, the DC stabilization power supply system 10B according to Embodiment 2, and the DC stabilization power supply system 10C according to Embodiment 3 are applied to the electric system of the aircraft, the present invention is not limited to this, and can be suitably applied to electric systems other than the electric system of the aircraft. For example, in Embodiment 4, a configuration in which the present invention is applied to the electric system of ground power supply equipment will be described.

Figure 14:
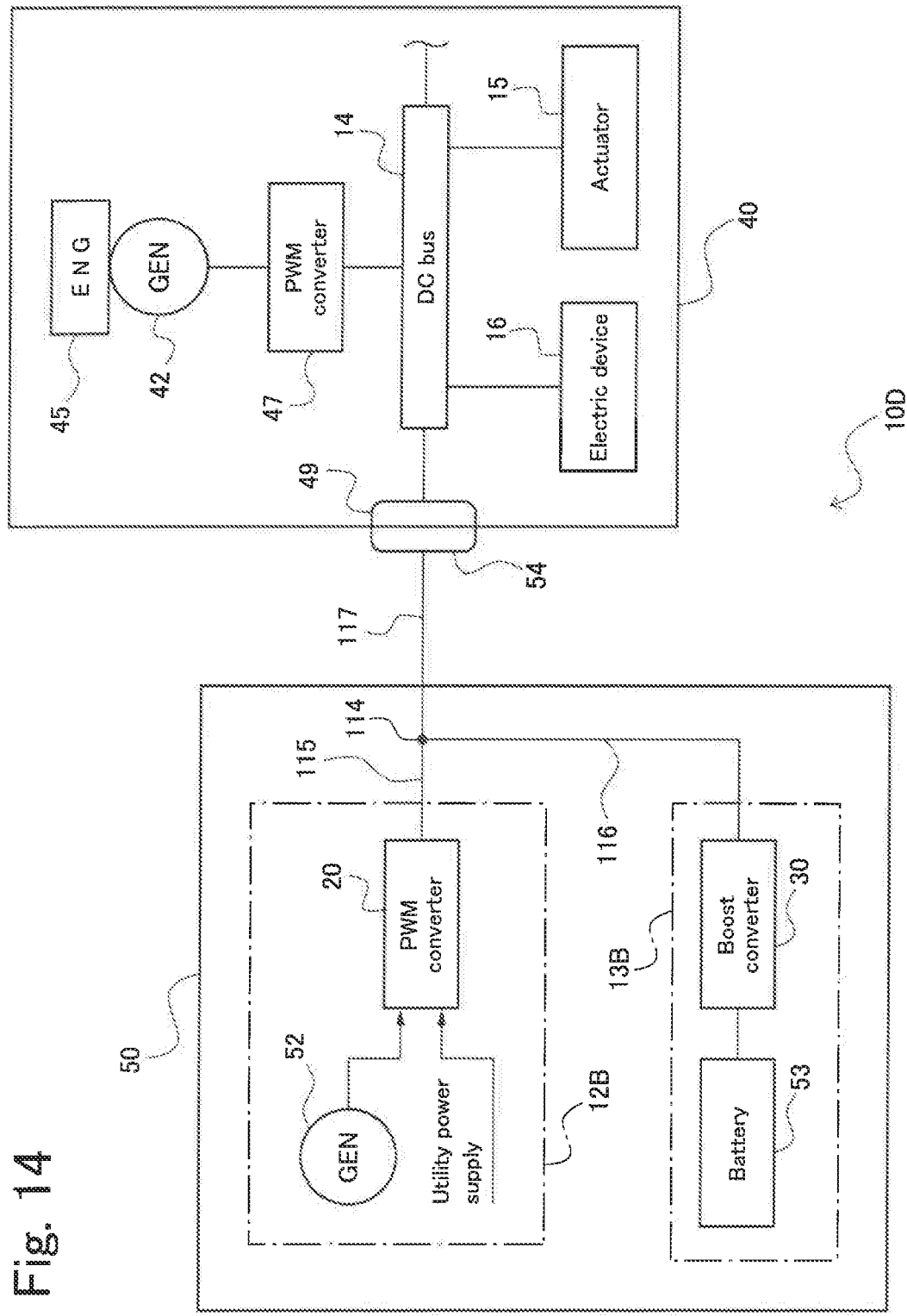
FIG. 14 is a block diagram showing an example of the configuration of a DC stabilization power supply system according to Embodiment 4 of the present invention.

As shown in FIG. 14, a DC stabilization power supply system 10D according to Embodiment 4 includes an aircraft 40 and ground power supply equipment 50. The aircraft 40 includes the electric system including the DC bus 14, the actuator 15, the electric device 16, and the like, the engine 45 in which the generator 42 (engine generator 42) is mounted, and the PWM converter 47. A fixed socket 49 is connected to the DC bus 14 of the aircraft 40.

The ground power supply equipment 50 includes a first DC power supply section 12B and a second DC power supply section 13B. The first DC power supply section 12B includes a generator 52 and the PWM converter 20. The generator 52 can supply the AC power to the PWM converter 20. In addition, an external utility power supply can supply the AC power to the PWM converter 20. The second DC power supply section 13B includes a battery 53 and the boost converter 30.

A generator DC wire 115 is connected to the PWM converter 20 of the first DC power supply section 12B. A battery DC wire 116 is connected to the boost converter 30 of the second DC power supply section 13B. The generator DC wire 115 and the battery DC wire 116 are connected to each other via the DC link 114. A socket wire 117 is connected to the DC link 114. A non-fixed socket 54 connectable to the fixed socket 49 of the aircraft 40 is connected to the socket wire 117. The specific configurations of the first DC power supply section 12B, the second DC power supply section 13B, the DC link 114, and the wires 115, 116, 117, which are included in the ground power supply equipment 50 are not particularly limited. The first DC power supply section 12B, the second DC power supply section 13B, the DC link 114, and the wires 115, 116, 117 are similar to the first DC power supply section 12A, the second DC power supply section 13A, the DC link 114, the wires 112, 113, and the like, respectively, which are described in Embodiment 1 to Embodiment 3. The specific configurations of the fixed socket 49, the non-fixed socket 54, and the like are not particularly limited, and know constituents may be used.

In accordance with the present embodiment, the ground power supply equipment 50 includes the DC stabilization power supply system 10D similar to the DC stabilization power supply systems 10A to 10C according to Embodiment 1 to Embodiment 3. Therefore, the power supply stabilization operation is well Shared (divided) by the two DC power supply sections 12B, 13B. Therefore, in a case where the DC power is supplied to the aircraft 40 in which the MEA has been progressed, the power supply operation can be well carried out. In addition, the power absorption operation for absorbing the regenerative power generated from the actuator 15, the electric device 16, and the like can be well carried out. Further, the ground power supply equipment 50 can be used as a starting power supply for starting the engine 45 of the aircraft 40.

The ground power supply equipment 50 may be a fixed ground power unit (GPU) disposed at a fixed position in an airport, or an air power supply car including the generator 52 and a relay unit of the utility power supply. Depending on the kind of the aircraft 40, the first DC power supply section 12B of the ground power supply equipment 50 may include only the generator 52 or only the relay unit of the utility power supply.

The present invention is not limited to the description of the above-described embodiments, and can be changed in various ways within a scope defined in claims. An embodiment obtained by suitably combining technical means disclosed in different embodiments or several modified examples is also included in the technical scope of the present invention.

INDUSTRIAL APPLICABILITY

The present invention can be suitably used in the field of stabilization of the electric system which is driven mainly by DC power, for example, the field of the electric system of the aircraft in which the MEA has been progressed.

REFERENCE SIGNS LIST

10A, 10B, 10C, 10D DC stabilization power supply system
12A, 12B first DC power supply section
13A, 13B second DC power supply section
14 DC bus
15 actuator (electric device)
16 electric device
17 third DC power supply section
20 PWM converter (power conversion section)
21 power conversion circuit
22 AC voltage detection section
23 AC detection section
24 DC voltage detection section
25 power conversion control section
30 boost converter (charging/discharging control section)
31 voltage regulation circuit
32 DC detection section
33 DC voltage control section 34 battery state monitoring section power supply monitoring section
35 DC voltage control section
40 aircraft
42 generator (AC power supply)
43 battery (DC power supply)
44 APU generator (AC power supply)
45 engine
46 APU (auxiliary power unit)
50 ground power supply equipment
114 DC link
202, 205 PI controller
204 dead band
254 DC voltage command calculation section
255, 257 current command calculation section
256 power conversion circuit control section
305 proportional controller
307 derivative controller
312 PI controller
311 upper/lower limiter
351 SOC compensation voltage calculation section
352, 354, 355 current command calculation section
355 voltage regulation circuit control section

The invention claimed is:

1. A direct current stabilization power supply system, comprising:
    an electric system including a direct current bus and an electric device connected to the direct current bus;
    an alternating current power supply and a direct current power supply which supply electric power to the electric system;
    a charging/discharging control section which is connected to the direct current power supply and the direct current bus and controls charging and discharging amounts of the direct current power supply;
    a power conversion section which is connected to the charging/discharging control section, the alternating current power supply, and the direct current bus, and bidirectionally converts alternating current power and direct current power; and
    a first direct current power supply section including at least the alternating current power supply and the power conversion section, and a second direct current power supply section including at least the direct current power supply and the charging/discharging control section, the first direct current power supply section and the second direct current power supply section being operative as a direct current power supply section which performs a power supply stabilization operation for supplying the direct current power to the electric system and absorbing regenerative power generated from the electric device,
    wherein the power conversion section is configured to control adjustment of an amount of the power supply stabilization operation to be performed by the first direct current power supply section and an amount of the power supply stabilization operation to be performed by the second direct current power supply section, by changing a target value of a voltage of the direct current bus.

2. The direct current stabilization power supply system according to claim 1,
    wherein the power conversion section is configured to control adjustment of the amount of the power supply stabilization operation to be performed by the first direct current power supply section and the amount of the power supply stabilization operation to be performed by the second direct current power supply section, by controlling the voltage of the direct current bus by a proportional-integral control, and
    wherein the charging/discharging control section is configured to control the charging and discharging amounts by a proportional control.

3. The direct current stabilization power supply system according to claim 2,
    wherein the power conversion section includes:
    a power conversion circuit connected to the alternating current power supply;
    an alternating current voltage detection section which detects an alternating current voltage of the alternating current power supply;
    an alternating current detection section which detects an alternating current of the alternating current power supply;
    a direct current voltage detection section which detects a direct current voltage of the electric system; and
    a power conversion control section which drives the power conversion circuit based on the alternating current voltage which is detected, the alternating current which is detected, and the direct current voltage which is detected,
    wherein the power conversion control section is configured to calculate active power of the alternating current power supply, based on the alternating current voltage which is detected and the alternating current which is detected,
    wherein the power conversion control section is configured to calculate a direct current voltage command value based on the active power and operation information of the alternating current power supply,
    wherein the power conversion control section is configured to calculate an alternating current command value based on the direct current voltage command value and the direct current voltage which is detected, by the proportional-integral control, and
    wherein the power conversion control section is configured to control the power conversion circuit by use of the alternating current command value.

4. The direct current stabilization power supply system according to claim 3,
    wherein the power conversion control section is configured to calculate a phase of the alternating current power supply based on the alternating current voltage which is detected, and
    wherein the power conversion control section is configured to control the power conversion circuit based on the alternating current command value, the alternating current which is detected, and the phase.

5. The direct current stabilization power supply system according to claim 2,
    wherein the charging/discharging control section includes:
    a voltage regulation circuit connected to the direct current power supply;
    a direct current power supply monitoring section which monitors a state of charge of the direct current power supply and a cell temperature of the direct current power supply;
    a direct current voltage detection section which detects a direct current voltage of the electric system;
    a direct current detection section which detects a direct current of the electric system; and
    a direct current voltage control section which drives the voltage regulation circuit, based on the state of charge of the direct current power supply, the direct current voltage which is detected, and the direct current which is detected, wherein the direct current voltage control section is configured to calculate a compensation voltage of the state of charge, based on the state of charge of the direct current power supply, wherein the direct current voltage control section is configured to calculate a direct current command value based on the compensation voltage of the state of charge, and the direct current voltage which is detected, by the proportional control, and wherein the direct current voltage control section is configured to control the voltage regulation circuit, by use of the direct current command value and the direct current which is detected.

6. The direct current stabilization power supply system according to claim 5, wherein the direct current voltage control section is configured to calculate the direct current command value based on the compensation voltage of the state of charge and the direct current voltage which is detected, by performing a derivative control concurrently with the proportional control.

7. The direct current stabilization power supply system according to claim 1, wherein a voltage change range within which the power conversion section performs a control and a voltage change range within which the charging/discharging control section performs a control are preset to different ranges, wherein the power conversion section is configured to control adjustment of the amount of the power supply stabilization operation to be performed by the first direct current power supply section and the amount of the power supply stabilization operation to be performed by the second direct current power supply section, by a proportional-integral control, and wherein the charging/discharging control section is configured to control the charging and discharging amounts, by the proportional-integral control.

8. The direct current stabilization power supply system according to claim 7, wherein the power conversion section includes:
a power conversion circuit connected to the alternating current power supply;
an alternating current voltage detection section which detects an alternating current voltage of the alternating current power supply;
an alternating current detection section which detects an alternating current of the alternating current power supply;
a direct current voltage detection section which detects a direct current voltage of the electric system; and
a power conversion control section which drives the power conversion circuit based on the alternating current voltage which is detected, the alternating current which is detected, and the direct current voltage which is detected, wherein the power conversion control section is configured to calculate active power of the alternating current power supply, based on the alternating current voltage which is detected and the alternating current which is detected, wherein the power conversion control section is configured to calculate a direct current voltage command value based on the active power and operation information of the alternating current power supply, wherein the power conversion control section is configured to calculate an alternating current command value based on the direct current voltage command value and the direct current voltage which is detected, by the proportional-integral control, and wherein the power conversion control section is configured to control the power conversion circuit by use of the alternating current command value.

9. The direct current stabilization power supply system according to claim 8, wherein the power conversion control section is configured to calculate a phase of the alternating current power supply based on the alternating current voltage which is detected, and wherein the power conversion control section is configured to control the power conversion circuit based on the alternating current command value, the alternating current which is detected, and the phase.

10. The direct current stabilization power supply system according to claim 7, wherein the charging/discharging control section includes:
a voltage regulation circuit connected to the direct current power supply;
a direct current power supply monitoring section which monitors a state of charge of the direct current power supply and a cell temperature of the direct current power supply;
a direct current voltage detection section which detects a direct current voltage of the electric system;
a direct current detection section which detects a direct current of the electric system; and
a direct current voltage control section which drives the voltage regulation circuit, based on the state of charge of the direct current power supply, the direct current voltage which is detected, and the direct current which is detected, wherein the direct current voltage control section is configured to calculate a compensation voltage of the state of charge, based on the state of charge of the direct current power supply, wherein the direct current voltage control section is configured to calculate a direct current command value based on the compensation voltage of the state of charge, and the direct current voltage which is detected, by the proportional control, and wherein the direct current voltage control section is configured to control the voltage regulation circuit, by use of the direct current command value and the direct current which is detected.

11. The direct current stabilization power supply system according to claim 10, wherein the direct current voltage control section is configured to calculate the direct current command value based on the compensation voltage of the state of charge and the direct current voltage which is detected, by performing a derivative control concurrently with the proportional control.

12. The direct current stabilization power supply system according to claim 1, wherein a reference value of a direct current voltage of the electric system is preset, wherein the power conversion section is configured to increase or decrease the reference value, and wherein the charging/discharging control section is configured to control the charging and discharging amounts of the direct current power supply to decrease or increase the direct current voltage, according to an increase or decrease in the reference value.

13. The direct current stabilization power supply system according to claim 1,
wherein a limit value of a change in the electric power of the alternating current power supply is preset,
wherein the power conversion section is configured to change a direct current voltage at a high rate, in a case where the change in the electric power which exceeds the limit value occurs, and
wherein the charging/discharging control section is configured to control the charging and discharging amounts of the direct current power supply to supply the electric power corresponding to a change amount of the direct current voltage which is changed by the power conversion section.

14. The direct current stabilization power supply system according to claim 1,
wherein the power conversion section is configured to monitor active power of the alternating current power supply,
wherein a reference value of a direct current voltage of the electric system and a threshold of the active power are preset,
wherein the power conversion section is configured to increase the direct current voltage at a high rate for a first period which passes until the active power reaches 0 from a time point when the active power being monitored has fallen below the threshold, and then increase the direct current voltage at a rate lower than the rate in the first period until the active power reaches the reference value for a second period which passes after the active power has reached 0, and
wherein the charging/discharging control section is configured to control the charging and discharging amounts so that the direct current power supply is charged with the direct current power corresponding to a change amount of the direct current voltage in the second period, which is changed by the power conversion section.

15. The direct current stabilization power supply system according to claim 1,
wherein the alternating current power supply is a generator which is mounted in an engine and operates with a rotation of the engine.

16. The direct current stabilization power supply system according to claim 1,
wherein the direct current power supply is at least one of an electric accumulator and an electric double-layer capacitor.

17. The direct current stabilization power supply system according to claim 1,
wherein the electric device includes an electric actuator.

18. The direct current stabilization power supply system according to claim 1,
which is used in an electric system of an aircraft.

19. The direct current stabilization power supply system according to claim 18,
wherein the aircraft includes an auxiliary power unit (APU), and the second direct current power supply section functions as a power supply for starting the APU.

20. The direct current stabilization power supply system according to claim 18,
wherein the alternating current power supply includes an engine generator which is mounted in an engine included in the aircraft and operates according to a rotation of the engine, and an auxiliary power unit (APU) generator included in the APU, and
wherein in a case where the engine generator or the APU generator does not supply the electric power to the direct current bus, the second direct current power supply section supplies the electric power to the direct current bus.

21. The direct current stabilization power supply system according to claim 20,
wherein the first direct current power supply section includes the engine generator as the alternating current power supply, and
wherein the first direct current power supply section is configured to operate as a motor controller and a motor for starting the engine, by the electric power supplied from the APU generator, when the engine is started.

22. The direct current stabilization power supply system according to claim 20, further comprising:
an auxiliary power unit (APU) power conversion section which is connected to the APU generator and the direct current bus, and bidirectionally converts the alternating current power and the direct current power,
wherein at least the APU generator and the APU power conversion section constitute a third direct current power supply section, and
wherein the APU power conversion section is configured to control adjustment of the amount of the power supply stabilization operation to be performed by the third direct current power supply section and the amount of the power supply stabilization operation to be performed by the second direct current power supply section, based on a change in the voltage of the direct current bus.

* * * * *